(12) United States Patent
Hoefken

(10) Patent No.: US 10,655,715 B2
(45) Date of Patent: May 19, 2020

(54) MOTORIZED GEARBOX MECHANISM

(71) Applicant: Motus Labs, LLC, Dallas, TX (US)

(72) Inventor: Carlos A. Hoefken, Dallas, TX (US)

(73) Assignee: Motus Labs, LLC, Dallas, TX (US)

( * ) Notice: Subject to any disclaimer, the term of this patent is extended or adjusted under 35 U.S.C. 154(b) by 0 days.

(21) Appl. No.: 16/208,129

(22) Filed: Dec. 3, 2018

(65) Prior Publication Data

US 2019/0101194 A1 Apr. 4, 2019

Related U.S. Application Data

(63) Continuation of application No. 15/996,179, filed on Jun. 1, 2018, now Pat. No. 10,151,375, which is a continuation-in-part of application No. 14/995,094, filed on Jan. 13, 2016, now Pat. No. 10,260,606, which is a continuation of application No. 13/795,488, filed on Mar. 12, 2013, now Pat. No. 9,261,176.

(51) Int. Cl.
*F16H 25/06* (2006.01)
*F16H 29/02* (2006.01)

(52) U.S. Cl.
CPC ............. *F16H 25/06* (2013.01); *F16H 29/02* (2013.01); *Y10T 74/18296* (2015.01)

(58) Field of Classification Search
CPC ................................ F16H 25/06; F16H 29/02
See application file for complete search history.

(56) References Cited

U.S. PATENT DOCUMENTS

| | | | |
|---|---|---|---|
| 1,666,458 | A | 4/1928 | Leland |
| 2,071,235 | A | 2/1937 | Newman |
| 2,134,603 | A | 10/1938 | Pickering |
| 2,167,590 | A | 7/1939 | Slaugenhop |
| 2,521,067 | A | 9/1950 | Kenison |
| 2,843,095 | A | 7/1958 | Prentice |

(Continued)

FOREIGN PATENT DOCUMENTS

CN 102121511 B 7/2011

OTHER PUBLICATIONS

Schwartz et al, "Making the Right Shaft Connections," MachineDesign, Aug. 1, 2000, pp. 1-26, online document.

*Primary Examiner* — David M Fenstermacher
(74) *Attorney, Agent, or Firm* — Jeffrey G. Degenfelder; Carstens & Cahoon, LLP

(57) ABSTRACT

The improved motorized gearbox mechanism of the present invention includes a plurality of cam-actuated gear block assemblies, which transfer power from an integral rotor and stator assembly contained in a cam/rotor assembly, to a secondary or output gear element. Each gear block assembly includes a gear block having a surface that periodically interfaces with a secondary or output gear element. When energized, the stator assembly interacts with the rotor assembly inducing the cam/rotor assembly to rotate about its central axis, thereby driving the output gear element via the plurality of cam-actuated gear block assemblies. The motorized gearbox mechanism may be powered electrically, hydraulically, pneumatically or by steam, or any conventional power source that can be adapted to use an integral stator/rotor assembly configured in the cam assembly body to generate rotative power in the cam/rotor assembly.

20 Claims, 13 Drawing Sheets

(56) References Cited

U.S. PATENT DOCUMENTS

| | | | |
|---|---|---|---|
| 3,088,333 A | 5/1963 | Walton | |
| 3,386,298 A | 6/1968 | Luther | |
| 3,650,157 A | 3/1972 | Stratheam et al. | |
| 3,848,474 A | 11/1974 | Epstein | |
| 3,913,417 A | 10/1975 | Vangor | |
| 4,075,893 A | 2/1978 | Koch | |
| 4,179,945 A | 12/1979 | Obermann | |
| 4,563,911 A * | 1/1986 | Chauvigne | F16H 31/004 74/125 |
| 4,743,763 A | 5/1988 | Cutburth et al. | |
| 5,029,486 A * | 7/1991 | Mercat | B62M 9/08 280/236 |
| 5,351,568 A | 10/1994 | Feterl | |
| 5,600,999 A | 2/1997 | Folino | |
| 5,722,910 A | 3/1998 | Folino | |
| 6,109,136 A | 8/2000 | Dold | |
| 6,202,509 B1 | 3/2001 | Dold | |
| 6,220,115 B1 | 4/2001 | Him et al. | |
| 6,231,468 B1 | 5/2001 | Bajulaz | |
| 6,776,067 B2 * | 8/2004 | Bogelein | F16H 49/001 74/411 |
| 6,805,025 B2 * | 10/2004 | Ruttor | F16H 25/06 475/161 |
| 7,040,185 B2 * | 5/2006 | Houben | F16H 29/08 192/45.018 |
| 7,086,309 B2 * | 8/2006 | Stoianovici | F03C 1/04 74/640 |
| 7,211,016 B2 | 5/2007 | Yan et al. | |
| 8,516,981 B2 | 8/2013 | Jacques et al. | |
| 8,534,151 B2 | 9/2013 | Johnson et al. | |
| 8,720,399 B2 * | 5/2014 | Kato | F01L 1/3442 123/90.17 |
| 8,998,763 B2 | 4/2015 | Wengenroth | |
| 9,261,176 B2 * | 2/2016 | Hoefken | F16H 25/06 |
| 9,327,618 B2 * | 5/2016 | Villarroel | F16H 49/001 |
| 9,394,984 B2 | 7/2016 | Balsiger | |
| 9,897,189 B2 * | 2/2018 | Liang | F16H 49/001 |
| 10,151,375 B2 * | 12/2018 | Hoefken | F16H 29/02 |
| 10,240,666 B2 * | 3/2019 | Hoefken | F16H 25/06 |
| 10,428,916 B2 * | 10/2019 | Hoefken | F16H 25/06 |
| 2001/0020399 A1 | 9/2001 | Angeles et al. | |
| 2003/0047025 A1 | 3/2003 | Ruttor | |
| 2005/0229731 A1 | 10/2005 | Parks et al. | |
| 2007/0180940 A1 | 8/2007 | Mizon et al. | |
| 2010/0206686 A1 | 8/2010 | Johnson et al. | |
| 2011/0298322 A1 | 12/2011 | Sherwin et al. | |
| 2012/0289372 A1 | 11/2012 | Wengenroth | |
| 2012/0291731 A1 | 11/2012 | Parsche | |
| 2013/0255421 A1 | 10/2013 | Schmidt et al. | |
| 2014/0015382 A1 | 1/2014 | Kim | |
| 2014/0232159 A1 | 8/2014 | Villarroel et al. | |
| 2014/0248017 A1 | 9/2014 | Nakada | |
| 2016/0116021 A1 | 4/2016 | Jacobson | |
| 2016/0131232 A1 | 5/2016 | Hoefken | |
| 2016/0153535 A1 | 6/2016 | Yang et al. | |
| 2018/0363745 A1 | 12/2018 | Hoefken | |

* cited by examiner

MOTORIZED GEARBOX MECHANISM

CROSS-REFERENCE TO RELATED APPLICATION

This application is a continuation of U.S. patent application Ser. No. 15/996,179 filed Jun. 1, 2018 now U.S. Pat. No. 10,151,375, which is a continuation-in-part application of U.S. patent application Ser. No. 14/995,094 filed Jan. 13, 2016, which is a continuation application of U.S. patent application Ser. No. 13/795,488 filed Mar. 12, 2013 (now U.S. Pat. No. 9,261,176), the technical disclosures of which are hereby incorporated herein by reference.

BACKGROUND OF THE INVENTION

Technical Field of the Invention

The present invention relates to a motorized gearbox mechanism featuring cam-actuated gear block assemblies that periodically engage the output gear causing power transfer. It has particular, but not exclusive, application for use in servomotor assemblies.

Description of the Related Art

Conventional machines typically consist of a power source and a power transmission system, which provides controlled application of the power. A variety of proposals have previously been made in the art of power transmission systems. The simplest transmissions, often called gearboxes to reflect their simplicity (although complex systems are also called gearboxes in the vernacular), provide gear reduction (or, more rarely, an increase in speed), sometimes in conjunction with a change in direction of the powered shaft. A transmission system may be defined as an assembly of parts including a speed-changing gear mechanism and an output shaft by which power is transmitted from the power source (e.g., electric motor) to an output shaft. Often transmission refers simply to the gearbox that uses gears and gear trains to provide speed and torque conversions from a power source to another device.

Gearboxes have been used for many years and they have many different applications. In general, conventional gearboxes comprise four main elements: power source; drive train; housing and output means. The power source places force and motion into the drive train. The power source may be a motor connected to the drive train through suitable gearing, such as a spur, bevel, helical or worm gear.

The drive train enables the manipulation of output motion and force with respect to the input motion and force provided by the power source. The drive train typically comprises a plurality of gears of varying parameters such as different sizes, number of teeth, tooth type and usage, for example spur gears, helical gears, worm gears and/or internal or externally toothed gears.

The gearbox housing is the means which retains the internal workings of the gearbox in the correct manner. For example it allows the power source, drive train and output means to be held in the correct relationship for the desired operation of the gearbox. The output means is associated with the drive train and allows the force and motion from the drive train to be applied for an application. Usually, the output means exits the gearbox housing.

The output means typically can be connected to a body whereby the resultant output motion and force from the drive train is transmitted via the output means (e.g., an output shaft) to the body to impart the output mean's motion and force upon the body. Alternatively, the output means can impart the motion and force output from the drive train to the gearbox housing whereby the output means is held sufficiently as to allow the gearbox housing to rotate.

Rotating power sources typically operate at higher rotational speeds than the devices that will use that power. Consequently, gearboxes not only transmit power but also convert speed into torque. The torque ratio of a gear train, also known as its mechanical advantage, is determined by the gear ratio. The energy generated from any power source has to go through the internal components of the gearbox in the form of stresses or mechanical pressure on the gear elements. Therefore, a critical aspect in any gearbox design comprises engineering the proper contact between the intermeshing gear elements. These contacts are typically points or lines on the gear teeth where the force concentrates. Because the area of contact points or lines in conventional gear trains is typically very low and the amount of power transmitted is considerable, the resultant stress along the points or lines of contact is in all cases very high. For this reason, designers of gearbox devices typically concentrate a substantial portion of their engineering efforts in creating as large a line of contact as possible or create as many simultaneous points of contacts between the two intermeshed gears in order to reduce the resultant stress experienced by the respective teeth of each gear.

Another important consideration in gearbox design is minimizing the amount of backlash between intermeshing gears. Backlash is the striking back of connected wheels in a piece of mechanism when pressure is applied. In the context of gears, backlash (sometimes called lash or play) is clearance between mating components, or the amount of lost motion due to clearance or slackness when movement is reversed and contact is re-established. For example, in a pair of gears backlash is the amount of clearance between mated gear teeth.

Theoretically, backlash should be zero, but in actual practice some backlash is typically allowed to prevent jamming. It is unavoidable for nearly all reversing mechanical couplings, although its effects can be negated. Depending on the application it may or may not be desirable. Typical reasons for requiring backlash include allowing for lubrication, manufacturing errors, deflection under load and thermal expansion. Nonetheless, low backlash or even zero backlash is required in many applications to increase precision and to avoid shocks or vibrations. Consequently, zero backlash gear train devices are in many cases expensive, short lived and relatively heavy.

Weight and size are yet another consideration in the design of gearboxes. The concentration of the aforementioned stresses on points or lines of contact in the intermeshed gear trains necessitates the selection of materials that are able to resist those forces and stresses. However, those materials are oftentimes relatively heavy, hard and difficult to manufacture.

Thus, a need exists for an improved and more lightweight gearbox mechanism, which is capable of handling high stress loads in points or lines of contact between its intermeshed gears. Further, a need exists for an improved and more lightweight gearbox mechanism having low or zero backlash that is less expensive to manufacture and more reliable and durable.

SUMMARY OF THE INVENTION

The present invention overcomes many of the disadvantages of prior art gearbox mechanisms by utilizing a plurality of cam-actuated gear block assemblies to transfer power from a power shaft to a secondary or output gear element. Each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a plurality of linkage assemblies, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

Each linkage assembly comprises a linkage mechanism, which at its proximal end is pivotally attached end to its respective gear block and at its distal end maintains contact with its respective pathway or groove formed in the cam assembly. In a preferred embodiment, each linkage mechanism includes two pivotally coupled connector arms. An upper connector arm includes a first pivot point that is pivotally coupled to its respective gear block element and a second pivot point pivotally coupled to a lower connector arm. The lower connector arm includes a cam follower element at its distal end that maintains contact with its respective pathway or groove formed in the cam assembly. The lower connector arm further includes a pivot point having a fixed axis of rotation relative to the central axis of rotation of the cam assembly.

In a preferred embodiment, each gear block assembly includes three linkage assemblies pivotally coupled to the gear block and in constant contact with the cam assembly. The gear block includes pivot bars configured on opposing ends that serve to pivotally couple the linkage assemblies to the gear block. Two linkage assemblies are coupled to a pivot bar on one end while a single linkage assembly is coupled to the pivot bar on the opposing end. Each of the linkage assemblies includes a pivot point that is rotatively coupled to a fixed axis of rotation relative to the central axis of rotation of the cam assembly. In one embodiment, this fixed pivot point comprises a pivot bar fixably contained between two stationary plates. Each of the linkage assemblies is biased so that its respective cam follower element maintains contact with the surface of its respective pathway or groove formed in the cam assembly throughout the rotation cycle of the cam assembly.

The gear block assembly is designed to drive its respective gear block through a two-dimensional circuit in response to rotation of the cam assembly. Broadly speaking, the two-dimensional circuit includes urging the gear block to engage a secondary or output gear element and move or rotate a specified quantum distance prior to disengaging from the output gear element, and returning back the specified quantum distance to again reengage the secondary or output gear element once again and repeat the process. The travel path or circuit of each gear block is controlled by adjusting the length and configuration of the various linkage assemblies and altering the pathways or grooves formed in the cam assembly.

When adapted to a gearbox mechanism a plurality of gear block assemblies are configured about a central axis of the cam assembly. The cam assembly is rotatively coupled to a power source. As the cam assembly rotates, the cam follower elements of the respective linkage assemblies of each gear block assembly maintain contact with a particular pathway or groove formed in the circumferential surface of the cam assembly. The variance of distance from the center of rotation of the different pathways or grooves of the cam assembly causes the respective linkage assemblies to work in concert to move their respective gear block through a predetermined circuit of movement. This predetermined circuit of movement of the gear block can be precisely calibrated to meet specific engineering requirements. For example, the torque ratio and speed reduction may be regulated and controlled by adjusting the circuit of movement of each gear block assembly.

Numerous embodiments of gearbox mechanisms are possible using the gear block assembly of the present invention. The plurality of gear block assemblies configured about the central axis of the cam assembly can comprise either an odd or even number of gear block assemblies. At least two, and preferably three gear block assemblies are required for a gearbox mechanism of the present invention. The movement of the gear block assemblies typically move in a rotational series to one another. At least one gear block assembly is always engaged with the output gear element at any particular instance in time. Preferably, only one gear block assembly is disengaged with the output gear element at any particular instance in time. However, in another preferred embodiment wherein the plurality of gear block assemblies comprises four or more even-numbered gear block assemblies, the gear block assemblies configured on opposing sides of the cam assembly engage and disengage in unison from the secondary or output gear element.

The design of the gear block assemblies of the present invention enable a greater number of gear teeth to engage the output gear at any given time, thereby spreading the stresses associated therein across a greater area. By dramatically increasing the contact area between the gear block and the output gear at any given time the mechanical stress level is significantly decreased. In addition, the gear block assemblies of the present invention reduce backlash to zero and even preloaded conditions to create a tight connection between the power source and the powered device. This is an extremely desirable feature especially for high vibration applications. By reducing backlash to zero or preloaded condition, the mechanical impedance may also be reduced at a broad range of high vibration frequencies. Moreover, because the stresses associated with engagement of the gear block against the output gear are distributed across a greater area, the gear block mechanism may be manufactured of lighter weight, more flexible materials, which are less expensive and easier to manufacture, with no degradation in reliability. Indeed, using flexible materials further reduces the mechanical impedance at low frequencies. By reducing its weight and size, the gearbox mechanism of the present invention is adaptable to a broad range of applications that were previously impractical because of weight and space limitations.

The design of the gear box assemblies of the present invention provides unique design opportunities for powering the gearbox mechanism. For example, in one embodiment, a conventional output device (e.g., a shaft) of a power source is coupled to the cam assembly along its central axis. In such an embodiment, the power source may comprise an electric motor, an internal combustion engine, or any conventional power source that can be adapted to generate rotative power in an output device. However, in more advanced embodiments of the present invention, the power source is incorporated within the gearbox mechanism creating a self-contained, motorized gearbox mechanism. Such embodiments include a rotor element or assembly configured in the cam assembly of the gearbox that rotates about a stator element attached to a stationary plate. The motorized gearbox mechanism may be powered electrically, hydraulically, pneumatically or by steam, or any conventional power source that can be adapted to use an integral stator/rotor assembly configured within the cam assembly to generate rotative power in the cam assembly.

BRIEF DESCRIPTION OF THE DRAWINGS

A more complete understanding of the method and apparatus of the present invention may be had by reference to the following detailed description when taken in conjunction with the accompanying drawings, wherein.

Figure 1A:
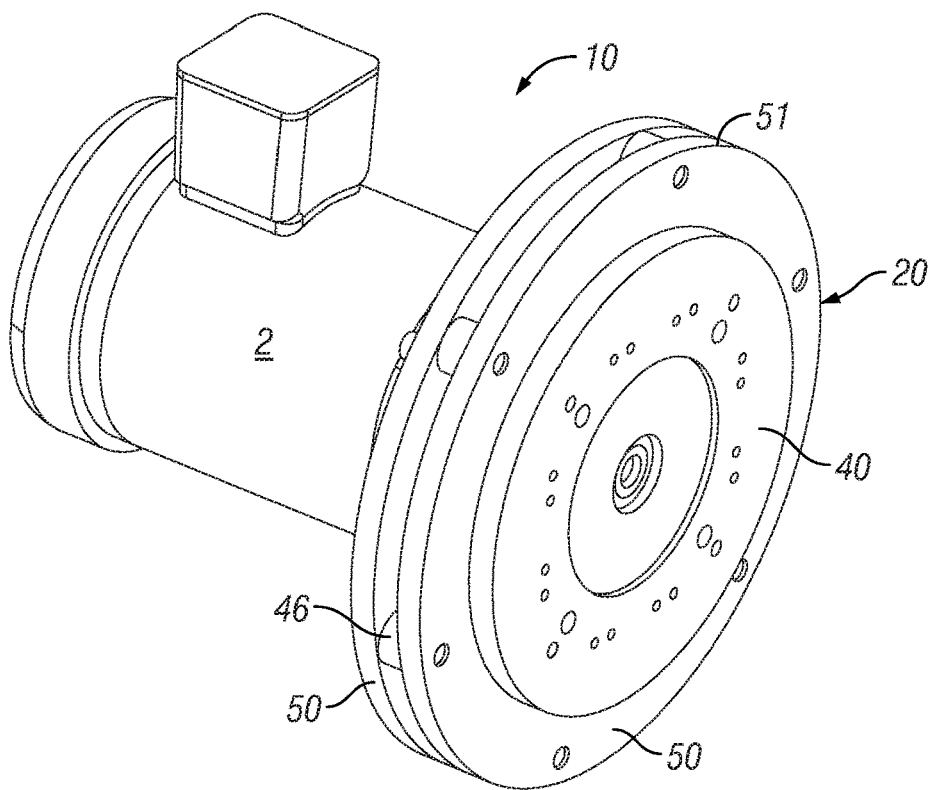
FIG. 1A is a perspective view of an embodiment of the gearbox mechanism of the present invention attached to a power source.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1B:
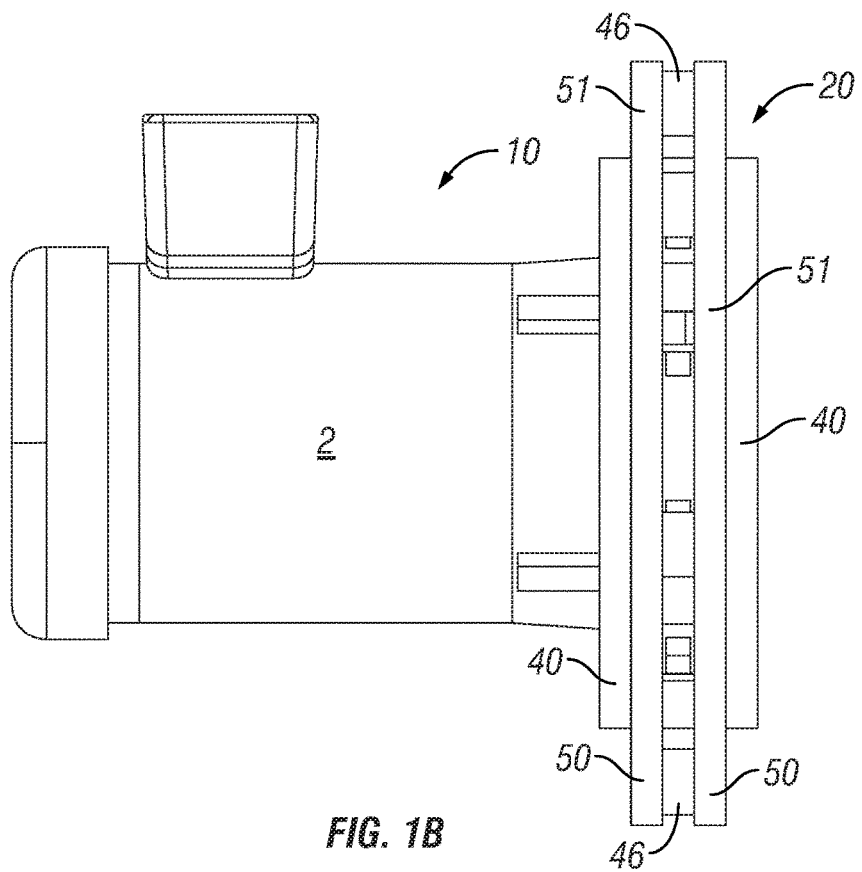
FIG. 1B is a side elevation view thereof.
Figure 2:
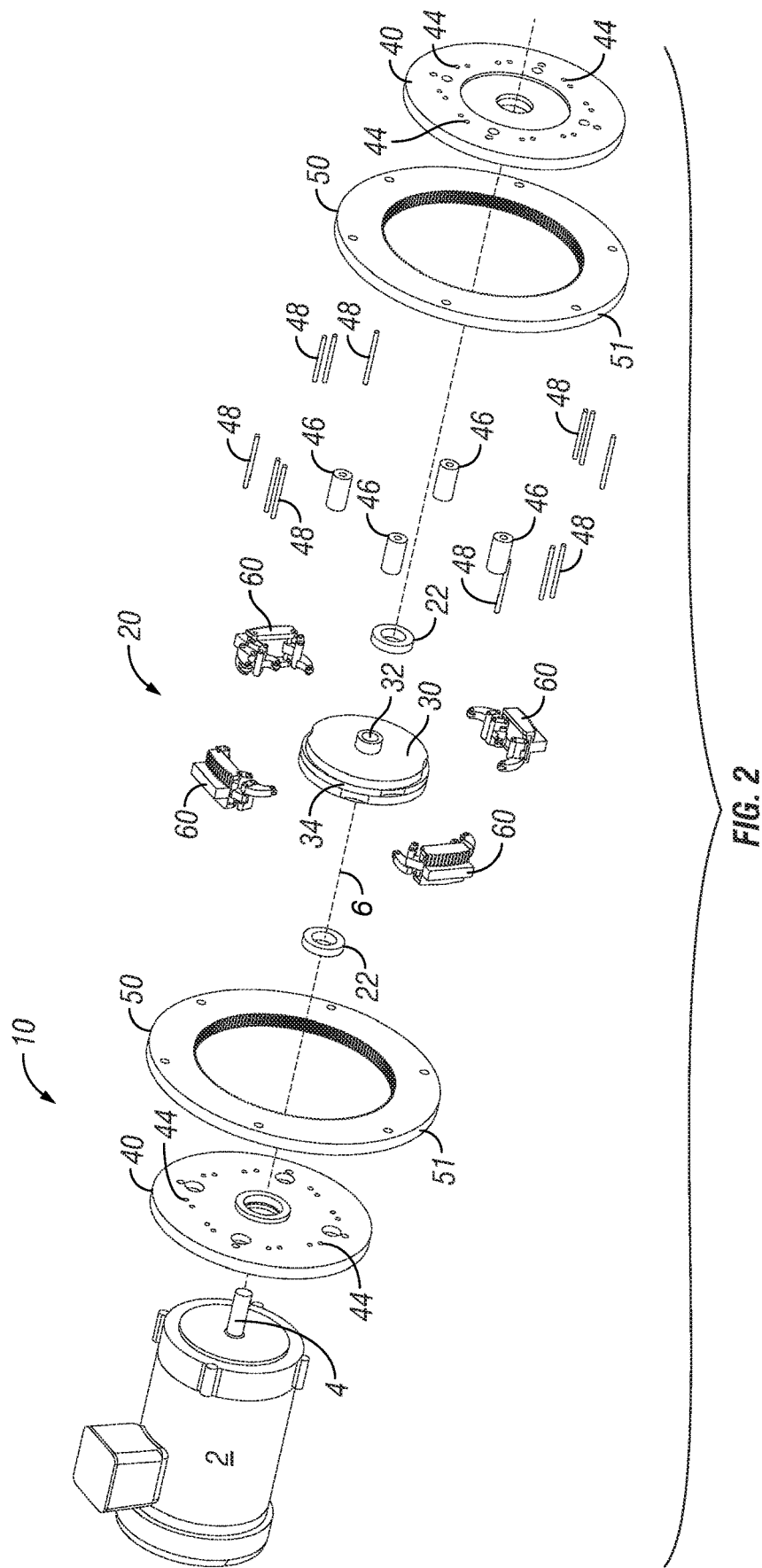
FIG. 2 is an exploded perspective view thereof.

With reference to the Figures, and in particular FIGS. 1A, 1B and 2, an embodiment of a machine 10 utilizing the gearbox mechanism 20 of the present invention is depicted. The machine 10 includes a power source or actuator 2, which includes an output device 4 that transmits the power generated by the power source 2. While the embodiment shown in the Figure generally depicts the power source 2 as an electric motor and the output device 4 as an output shaft of the electric motor, it is understood that there are numerous possible embodiments. For example, output device 4 need not be directly connected to the power source 2 but may be rotatively coupled by means of gears, chains, belts or magnetic fields. Likewise, the power source 2 may comprise an electric motor, an internal combustion engine, or any conventional power source that can be adapted to generate rotative power in an output device 4. Moreover, the power source 2 may also comprise the output gear of a preceding gear train mechanism.

The output device 4 comprises a central shaft that connected to the gearbox mechanism 20 through a central aperture 32 in the cam assembly 30 of the gearbox mechanism 20. The gearbox mechanism 20 is configured about the central axis 6 of the central shaft of the output device and comprises two stationary plates 40 between which are configured an output or power gear 50, a cam assembly 30 and a plurality of cam-acutated gear block assemblies 60, which transfer power from the cam assembly 30 to an output or power gear element 50. Two bearing assemblies 22 isolate the cam assembly 30 from the stationary plates 40 so that the cam assembly 30 can rotate freely between the two stationary plates 40. Likewise, spacer elements 46 configured between the two stationary plates 40 ensure that movement of the power gear element 50 is not impeded by the stationary plates 40. The gear block assemblies 60 are evenly spaced about the circumference of the cam assembly 30. Each gear block assembly 60 includes a gear block 62 and a plurality of linkage assemblies, which connect the gear block 62 to the outer circumferential surface of the cam assembly 30. Each linkage assembly comprises a linkage mechanism, which at its proximal end is pivotally attached to its respective gear block 62 and at its distal end includes a cam follower element, which maintains contact with its respective pathway or groove formed in the circumferential surface 34 of the cam assembly 30. Each linkage assembly includes a fixed axis pivot point that is connected to the two stationary plates 40. While each linkage assembly can pivot about its respective fixed axis pivot point 48 the alignment and configuration of the pivot point remains fixed in relation to the two stationary plates 40.

As shown in the embodiment depicted in FIGS. 1A, 1B and 2, the plurality of cam-actuated gear block assemblies 60 transfer power from the power shaft 4 to an annular secondary or output gear element 50. In a preferred embodiment, each gear block assembly 60 includes a gear block 62 having an interface surface 63 (e.g., a plurality of projections or teeth 66) which correspond to a complementary interface surface 54 (e.g., projections or gear teeth) configured on an inner circumferential surface 53 of the annular secondary or output gear element 50. It is understood that the interface between the gear block 62 and the inner circumferential surface 53 of the output gear element 50 of the present invention comprises not only the preferred gear teeth as depicted, but also any complementary arrangement such as pins and holes or even friction fit surfaces.

While the annular output or power gear element 50 is depicted as two circular rings held apart by spacer elements 46, it is understood that the output or power gear element 50 may comprise a single circular ring. The output or power gear element 50 includes apertures or holes 58 for attaching to an output shaft or power takeoff (not shown). In addition, it is understood that the outer circumference 51 of the output or power gear element 50 may also comprise a surface to interface with some other gear train mechanism.

In addition, it is understood that the gear block 62 may include a divider/alignment block 68 dividing the interface surface 63 into two separate sections. The variant of the gear block 62 featuring the alignment block 68 is particularly suitable to embodiments which feature output or power gear elements 50 comprised of two circular rings.

The gear blocks 62 of the present invention are specifically designed to enable a greater surface area (e.g., greater number of gear teeth) to engage the output gear 50 at any given time, thereby spreading the stresses associated therein across a greater area. By dramatically increasing the contact area between the gear block 62 and the output gear 50 at any given time the mechanical stress level is significantly decreased. In addition, the gear block 62 assemblies of the present invention reduce backlash to zero and even preloaded conditions to create a tight connection between the power source 2 and the powered device. This is an extremely desirable feature especially for high vibration applications. Moreover, because the stresses associated with engagement of the gear block 62 against the output gear 50 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam assembly 30 is coupled to the power source 2 by means of the output device or power shaft 4. Thus, power generated by the power source 2 is transferred to the power shaft 4, which causes the cam assembly 30 to rotate about the central axis 6. The cam assembly 30 includes about its circumferential surface 34 a plurality of unique pathways or grooves which each interface with the cam follower element of a single linkage assembly of each gear block assembly 60 so that as the cam assembly 30 rotates, the movement of the gear block 62 is controlled in two dimensions in accordance with a certain design parameter. By varying the radius of the pathway or grooves on the cam assembly 30 the linkage assemblies of the gear block assembly 60 drive respective gear block 62 through a two-dimensional circuit in response to rotation of the cam assembly 30. Broadly speaking, the two-dimensional circuit includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. The travel path or circuit of each gear block 62 is controlled by adjusting the length and configuration of the various linkage assemblies and altering the pathways or grooves formed in the cam assembly 30.

In a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam assembly 30. The lower connector arm further includes a pivot point having a fixed axis of rotation relative to the central axis 6 of rotation of the cam assembly 30.

With reference now to FIGS. 4A-4D, a preferred embodiment of the gear block assembly 60 is shown. In the depicted preferred embodiment, each gear block assembly 60 includes three linkage assemblies 70, 80, 90, which are each pivotally coupled to the gear block 62 and include a cam follower element 74, 84, 94, respectively, which maintain constant contact with the cam assembly 30. The gear block 62 includes pivot bars configured on opposing ends that serve to pivotally couple the linkage assemblies 70, 80, 90 to the gear block 62. For example, two linkage assemblies 70, 80 are pivotally coupled to a pivot bar 64$a$ on one end while a single linkage assembly 90 is pivotally coupled to the pivot bar 64$b$ on the opposing end. Each of the linkage assemblies 70, 80, 90 includes a pivot point 78, 88, 98, respectively, that is rotatively coupled to a fixed axis of rotation relative to the central axis 6 of rotation of the cam assembly 30. As depicted, each fixed axis of rotation comprises a pivot pin 48 that is secured in matching alignment holes 44 configured in the two stationary plates 40. While each of the linkage assemblies 70, 80, 90 can pivot about its respective fixed axis pivot point 78, 88, 98, respectively, the alignment and configuration of the pivot points remains fixed in relation to the two stationary plates 40. Each of the linkage assemblies 70, 80, 90 is biased so that its respective cam follower element 74, 84, 94, respectively, maintains contact with the surface of its respective pathway or groove formed in the cam assembly 30 throughout the rotation cycle of the cam assembly 30.

In the depicted preferred embodiment, each of the linkage assemblies may further comprise at least two connector arms. For example, the first linkage assembly 70 may include a lower connector arm 72 that is pivotally connected to an upper connector arm 74, which is also pivotally connected to the gear block 62. A pivot pin 71 serves to pivotally connect the lower connector arm 72 to the upper connector arm 74. The lower connector arm 72 includes a cam follower element 74 at its distal end. In a preferred embodiment the cam follower element 74 comprises a bearing wheel 75 rotatively coupled at the distal end of the lower connector arm by means of an axle 76. The lower connector arm 72 further includes a pivot point 78 that is rotatively coupled to a fixed axis of rotation relative to the central axis 6 of rotation of the cam assembly 30. For example, a pivot pin 48$a$ secured in matching alignment holes 44 configured in the two stationary plates 40 serves as a fixed axis of rotation relative to the central axis 6 of rotation of the cam assembly 30. While the lower connector arm 72 may pivot about its fixed axis pivot point 78, the alignment and configuration of the pivot point 78 remains fixed in relation to the two stationary plates 40. Each of the pivotal connections in the first linkage assembly 70 is biased so that the cam follower element 74 maintains contact with the surface of its respective pathway or groove 36 formed in the circumferential surface 34 of the cam assembly 30 throughout the rotation cycle of the cam assembly 30. For example, the pivotal connections may further include torsional spring elements (not shown) which bias the first linkage assembly 70 so that the cam follower element 74 maintains contact with the surface of its respective pathway or groove 36 formed in the circumferential surface 34 of the cam assembly 30 throughout the rotation cycle of the cam assembly 30. Alternatively, the cam follower element of each linkage assembly may include conjugate cams to bias the pivotal connections in the linkage assembly. Alternatively or in addition, a ring spring connecting all of the gear blocks 62 in a gear train may be used as a biasing mechanism in accordance with the present invention.

Similarly, the second linkage assembly 80 may include a lower connector arm 82 that is pivotally connected to an upper connector arm 84, which is also pivotally connected to the gear block 62. The upper connector arm 84 is pivotally connected to the gear block 62 by means of the same pivot bar 64a used to pivotally connect the upper connector arm 74 of the first linkage assembly 70. A pivot pin 81 serves to pivotally connect the lower connector arm 82 to the upper connector arm 84. The lower connector arm 82 includes a cam follower element 84 at its distal end. In a preferred embodiment the cam follower element 84 comprises a bearing wheel 85 rotatively coupled at the distal end of the lower connector arm by means of an axle 86. The lower connector arm 82 further includes a pivot point 88 that is rotatively coupled to a fixed axis of rotation relative to the central axis 6 of rotation of the cam assembly 30. For example, a pivot pin 48b secured in matching alignment holes 44 configured in the two stationary plates 40 serves as a fixed axis of rotation relative to the central axis 6 of rotation of the cam assembly 30. While the lower connector arm 82 may pivot about its fixed axis pivot point 88, the alignment and configuration of the pivot point 88 remains fixed in relation to the two stationary plates 40. Each of the pivotal connections in the second linkage assembly 80 is biased so that the cam follower element 84 maintains contact with the surface of its respective pathway or groove 37 formed in the circumferential surface 34 of the cam assembly 30 throughout the rotation cycle of the cam assembly 30. For example, the pivotal connections may further include torsional spring elements (not shown) which bias the second linkage assembly 80 so that the cam follower element 84 maintains contact with the surface of its respective pathway or groove 37 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Likewise, the third linkage assembly 90 may include a lower connector arm 92 that is pivotally connected to an upper connector arm 94, which is also pivotally connected to the gear block 62. The upper connector arm 94 of the third linkage assembly 90 is pivotally coupled to a pivot bar 64b configured on the opposing end of the gear block 62 as the pivot bar 64a to which the upper connector arms 74, 84 of the first and second linkage assemblies 70, 80 are rotatively coupled. A pivot pin 91 serves to pivotally connect the lower connector arm 92 to the upper connector arm 94. The lower connector arm 92 includes a cam follower element 94 at its distal end. In a preferred embodiment the cam follower element 94 comprises a bearing wheel 95 rotatively coupled at the distal end of the lower connector arm by means of an axle 96. The lower connector arm 92 further includes a pivot point 98 that is rotatively coupled to a fixed axis of rotation relative to the central axis 6 of rotation of the cam assembly 30. For example, a pivot pin 48c secured in matching alignment holes 44 configured in the two stationary plates 40 serves as a fixed axis of rotation relative to the central axis 6 of rotation of the cam assembly 30. While the lower connector arm 92 may pivot about its fixed axis pivot point 98, the alignment and configuration of the pivot point 98 remains fixed in relation to the two stationary plates 40. Each of the pivotal connections in the second linkage assembly 90 is biased so that the cam follower element 94 maintains contact with the surface of its respective pathway or groove 38 formed in the circumferential surface 34 of the cam assembly 30 throughout the rotation cycle of the cam assembly 30. For example, the pivotal connections may further include torsional spring elements (not shown) which bias the second linkage assembly 90 so that the cam follower element 94 maintains contact with the surface of its respective pathway or groove 38 formed in the circumferential surface 34 of the cam assembly 30 throughout the rotation cycle of the cam assembly 30. Alternatively or in addition, a ring spring connecting all of the gear blocks 62 in a gear train may be used as a biasing mechanism in accordance with the present invention.

Figure 4A:
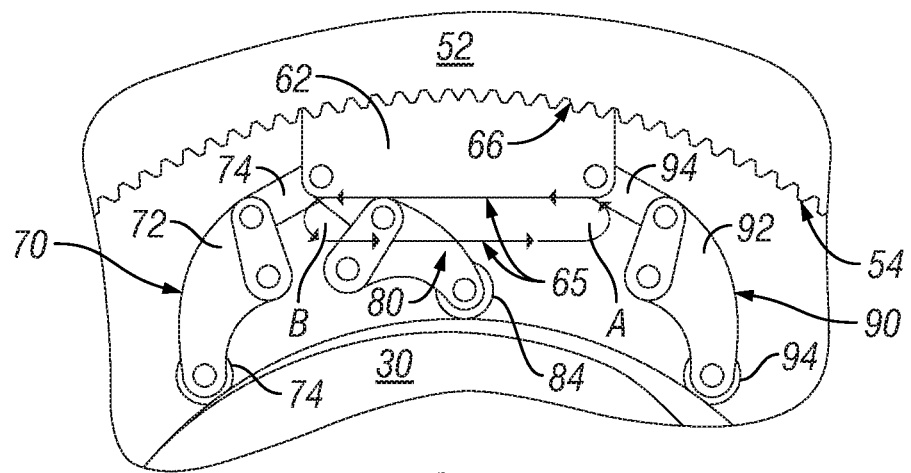
FIG. 4A is a close-up side elevation view of a gear block assembly shown in FIG. 3A.
Figure 4B:
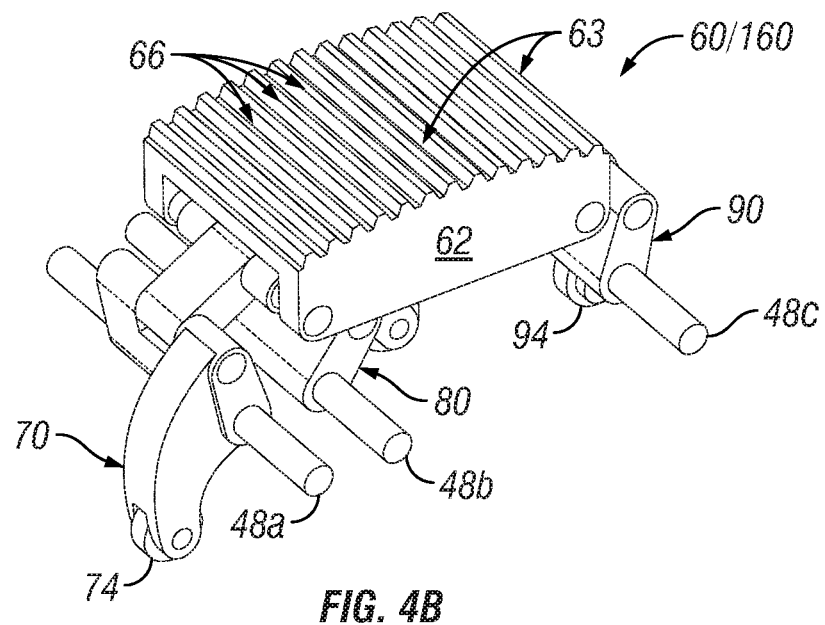
FIG. 4B is a perspective view of a gear block assembly shown in FIG. 3A.
Figure 4C:
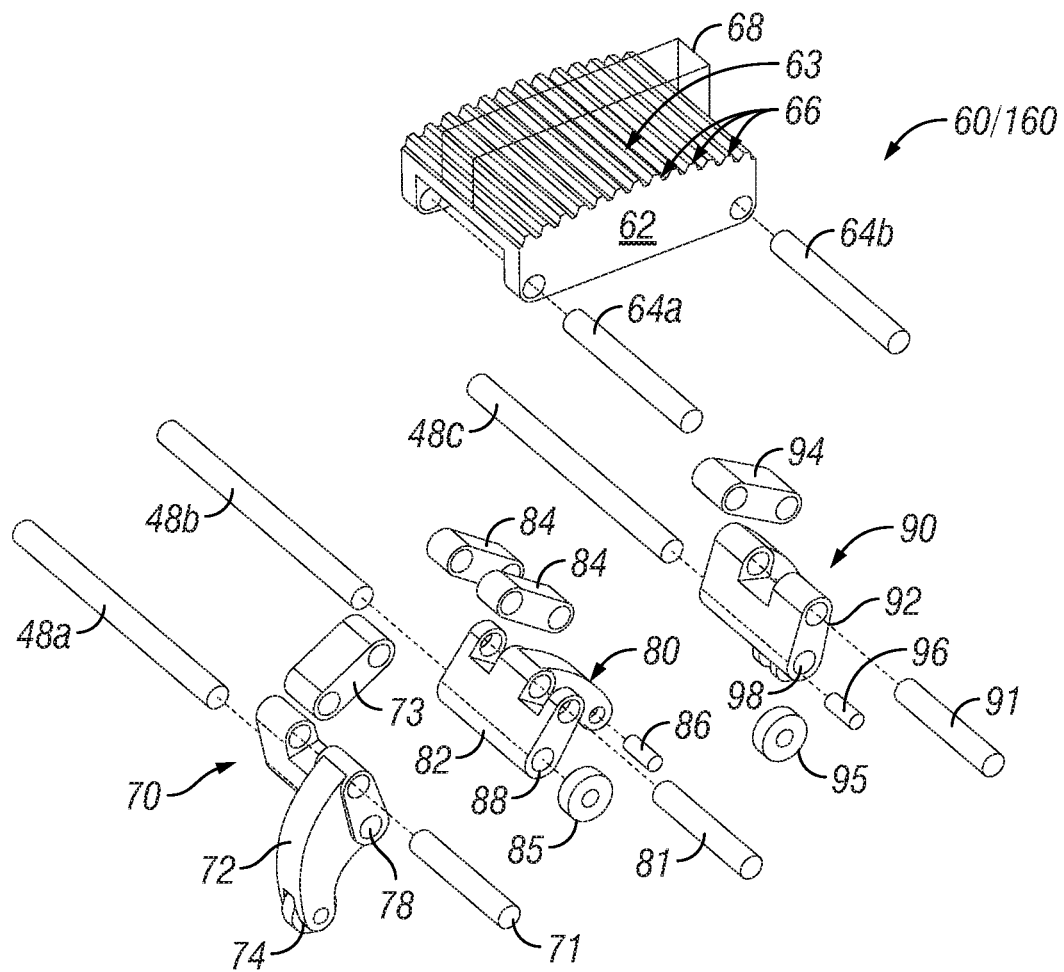
FIG. 4C is an exploded perspective view thereof.
Figure 4D:
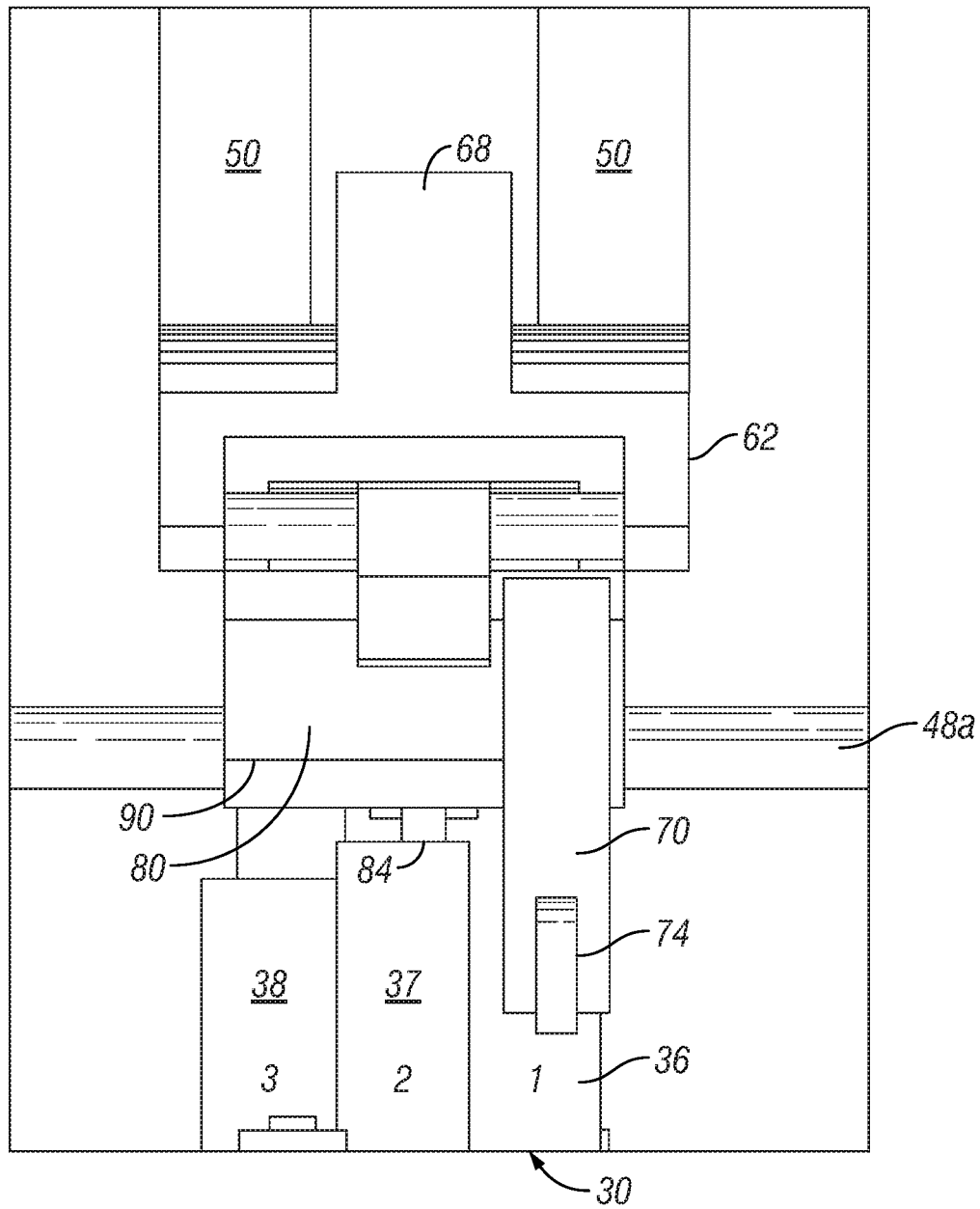
FIG. 4D is close-up cross-sectional view of a gear block assembly shown in FIG. 4A engaged with an output gear.
Figure 5:
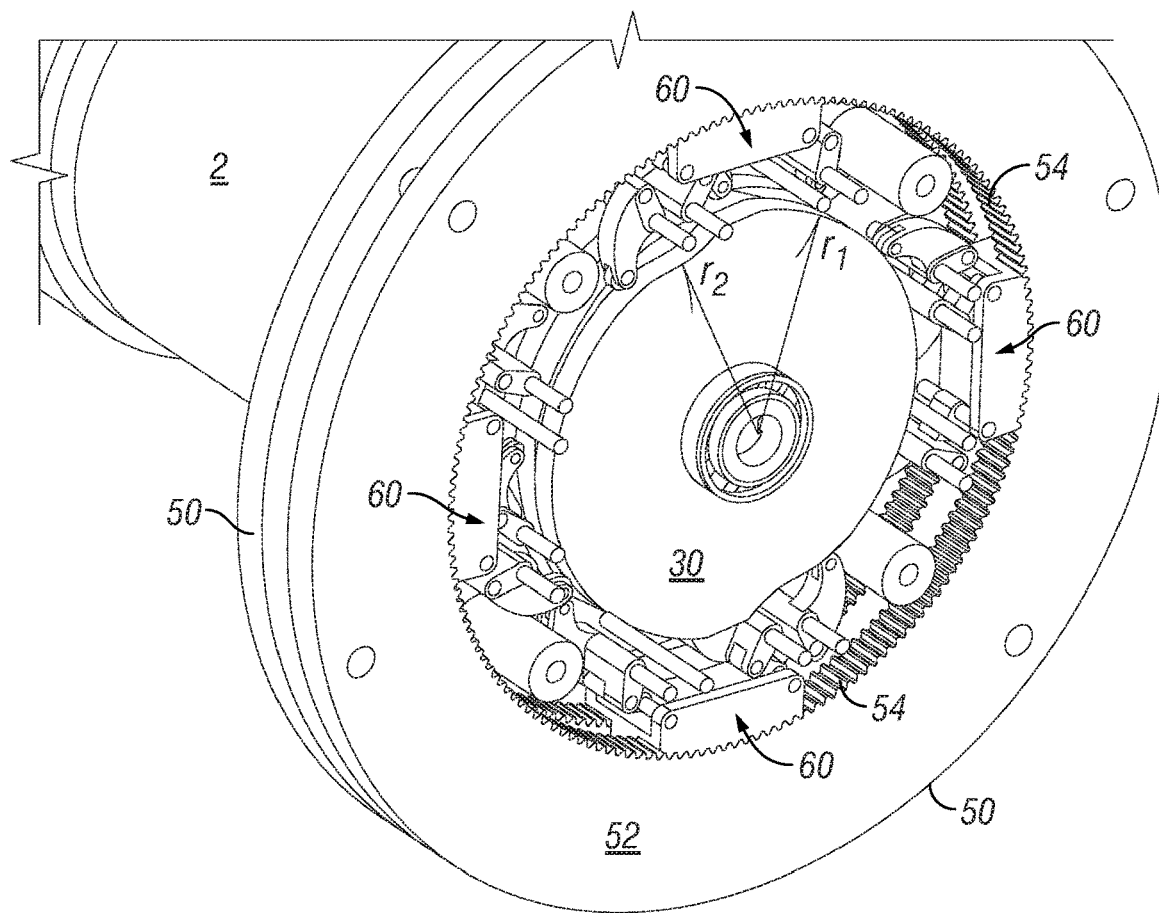
FIG. 5 is a perspective view of the embodiment of the gearbox mechanism shown in FIG. 3A.
Figure 6:
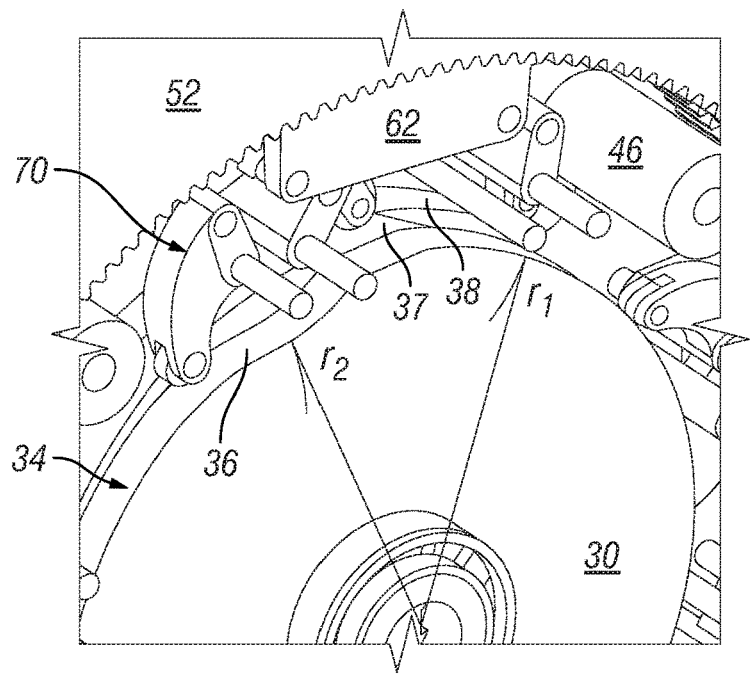
FIG. 6 is a close-up perspective view of a gear block assembly shown in FIG. 5.

Each of the linkage assemblies 70, 80, 90 is biased so that its respective cam follower element 74, 84, 94 maintains contact with the surface of its respective pathway or groove formed in the cam assembly 30 throughout the rotation cycle of the cam assembly 30. For example, cam follower element 74 maintains contact with the surface of a first pathway 36, cam follower element 84 maintains contact with the surface of a second pathway 37, and cam follower element 94 maintains contact with the surface of a third pathway 38. Each pathway has a unique circumference, the radius of which varies over the course of the pathway. Thus, for example as shown in FIGS. 5 and 6, the first pathway 36 has a first radius $r_1$ at one part of its circumference that is greater than a second radius $r_2$ at another part of its circumference. This creates a unique, undulating path for each pathway as the cam assembly 30 rotates. While the cam assembly 30 depicted in FIGS. 1-7, appears to be a single disc or unit having a plurality of pathways or grooves formed in the circumferential surface 34 of the cam assembly 30, it is understood that the cam assembly 30 may also comprise a plurality of separate discs, each having a unique pathway formed in its circumferential surface, which are mechanically coupled to one another to assemble a single cam assembly 30.

As the cam assembly 30 rotates, the cam follower element follows its respective pathway maintaining contact with the circumferential surface of the respective pathway. As the radius of the pathway changes, the respective linkage assembly pivots about its fixed axis pivot point to compensate. This pivoting of the linkage assembly about its fixed axis pivot point induces similar movement in the pivotal connection with the gear block 62, which results in movement of the gear block 62. Thus, as the cam assembly 30 rotates, the movement of the gear block 62 is controlled by the induced pivoting of the plurality linkage assemblies. For example, by varying the radius of the first pathway or groove 36 on the cam assembly 30, the first linkage assembly 70 pivots about its fixed axis pivot point 78 to compensate and maintain contact between the first cam follower 74 and the surface of the first pathway or groove 36. This pivoting of the first linkage assembly 70 about its fixed axis pivot point 78 induces movement in the pivotal connection with the gear block 62. Each linkage assembly acts independently of the other linkage assemblies due to the cam follower element of each linkage assembly following a distinct pathway formed in the circumferential surface of the cam assembly.

By varying the radius of each pathways or grooves 36, 37, 38 on the cam assembly 30, linkage assemblies 70, 80, 90 drive their respective gear block 62 through a two-dimensional circuit in response to rotation of the cam assembly 30. As shown in FIG. 4A, in general, the two-dimensional circuit 65 includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. It is understood that the two-dimensional circuit 65 depicted in the drawings is not to scale and is somewhat exaggerated to illustrate the general principal of the invention. For example, the distance A-B would typically be much smaller than depicted. The travel path or circuit 65 of each gear block 62 is controlled by adjusting the length and configuration of the various linkage assemblies and altering the pathways or grooves formed in the cam assembly 30.

When adapted to a gearbox mechanism 20, a plurality of gear block assemblies 60 are configured about the central axis 6 of the cam assembly 30. The cam assembly 30 is coupled with a power source 2 by means of output device 6. As the cam assembly 30 rotates, the cam follower elements (e.g., 74, 84, 94) of the respective linkage assemblies (e.g., 70, 80, 90) of each gear block assembly 60 maintain contact with a particular pathway or groove (e.g., 36, 37, 38) formed in the circumferential surface 34 of the cam assembly 30. The variance of distance from the center of rotation of the different pathways or grooves (e.g., 36, 37, 38) of the cam assembly 30 causes the linkage assemblies pivotally attached to its respective gear block 60 to work in concert to move their respective gear block through a predetermined circuit of movement 65. This predetermined circuit of movement 65 of the gear block 60 can be precisely calibrated to meet specific engineering requirements. For example, the torque ratio and speed reduction may be regulated and controlled by adjusting the circuit of movement 65 of each gear block assembly 60.

Figure 7A:
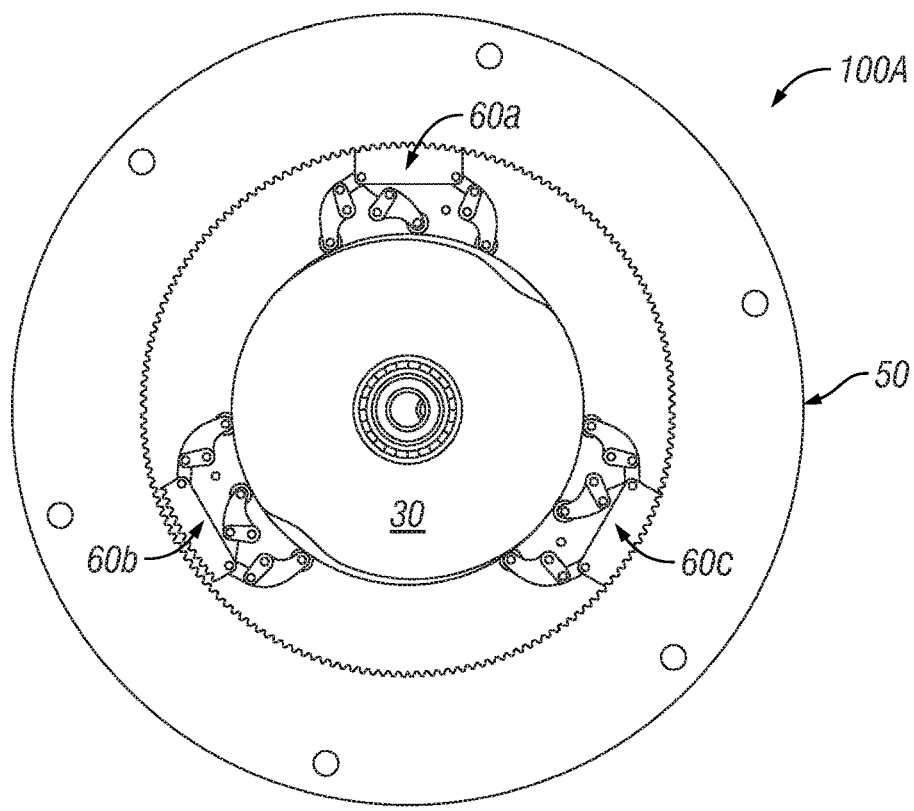
FIGS. 7A-7C are end views with the outer stationary plate removed of different embodiments of the gearbox mechanism of the present invention.
Figure 7B:
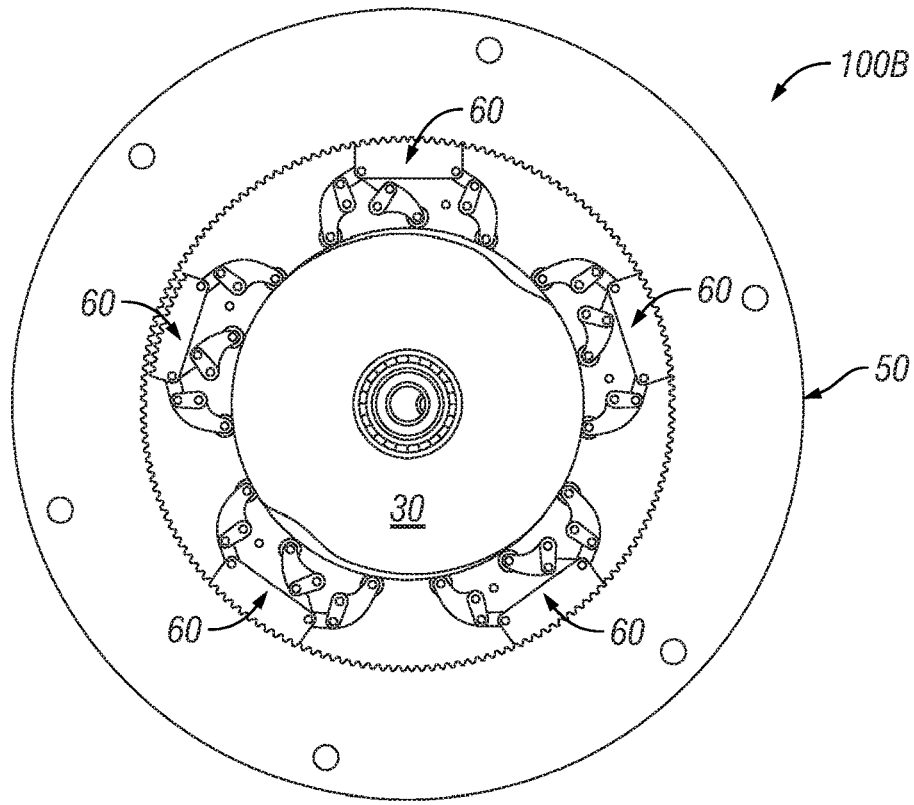

Numerous embodiments of gearbox mechanisms are possible using the gear block assembly 60 of the present invention. All embodiments of gearbox mechanisms constructed in accordance with the present invention feature a plurality of gear block assemblies 60 configured about the central axis 6 of the cam assembly 30 and may comprise either an odd or even number of gear block assemblies 60. At least two, and preferably three gear block assemblies are required for a gearbox mechanism of the present invention. For example, as shown in FIG. 7A, an embodiment of the gearbox mechanism 100A featuring three gear block assemblies 60 is depicted. FIG. 7B depicts an embodiment of the gearbox mechanism 100B featuring five gear block assemblies 60. The movement of the gear block assemblies 60 typically moves in a rotational series to one another.

Figure 3:
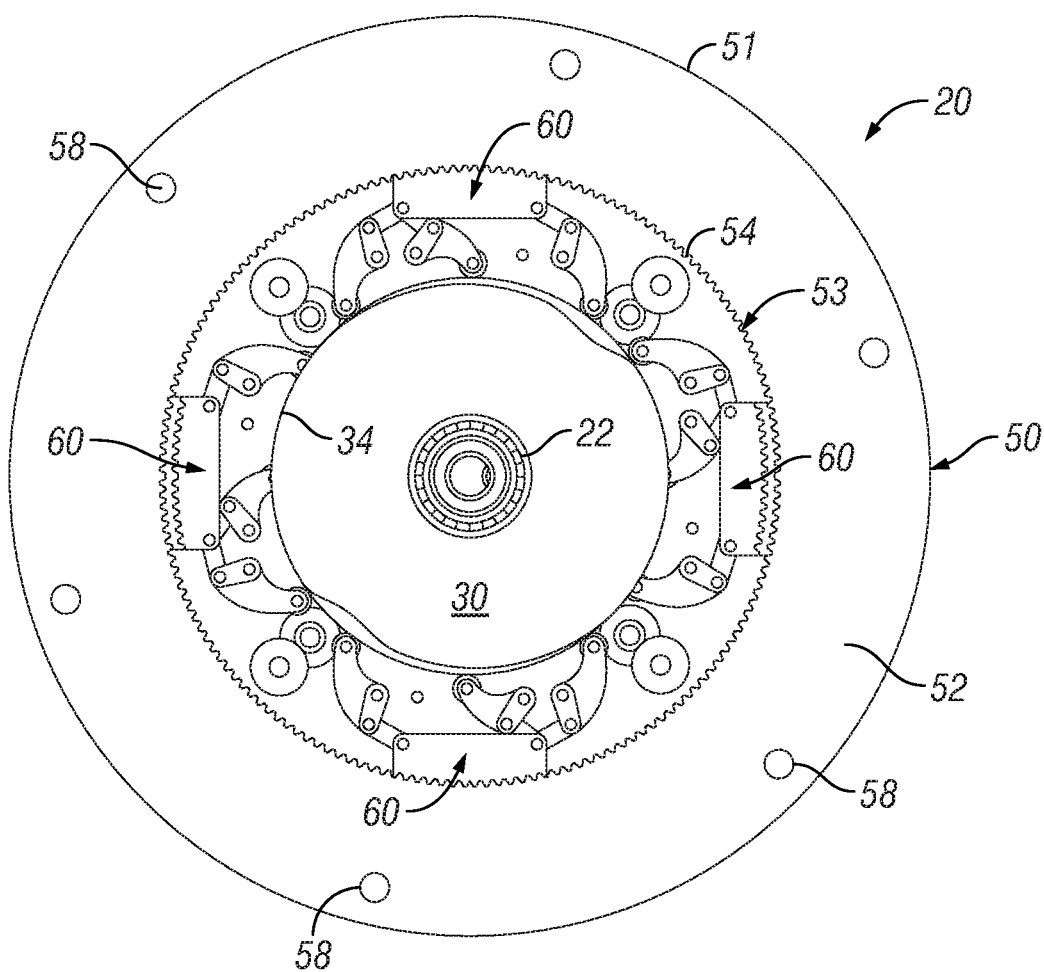
FIG. 3 is an end view thereof with the outer stationary plate removed.
Figure 7C:
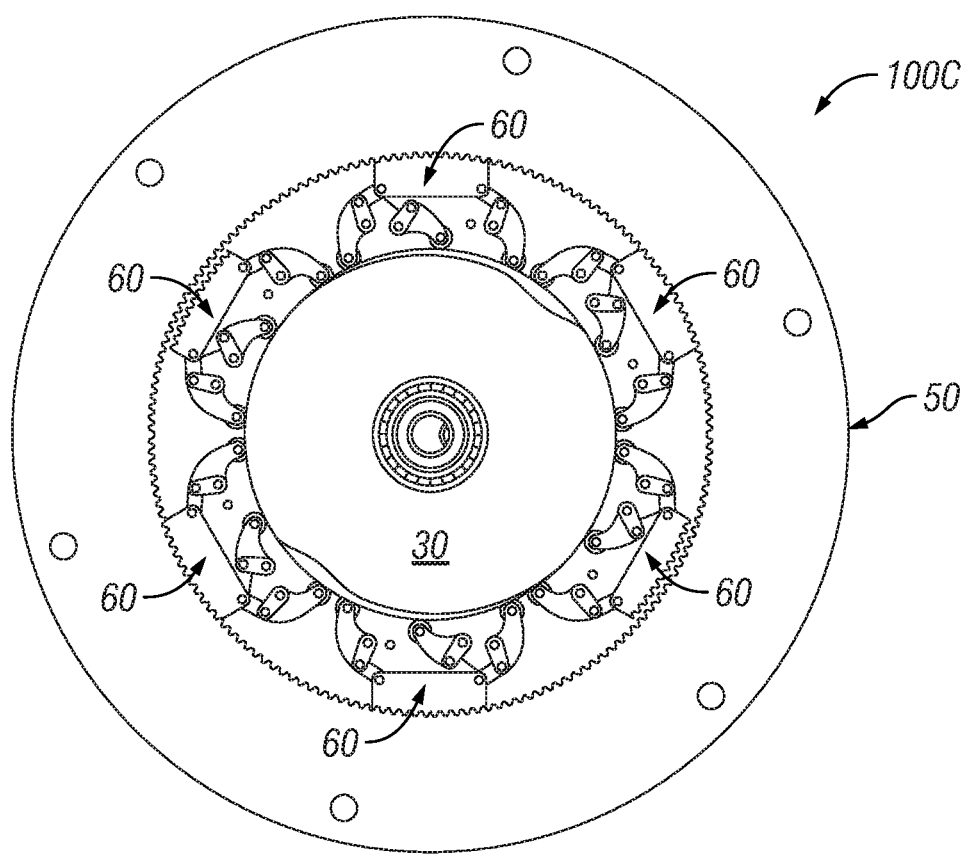

However, in a preferred embodiment of the present invention wherein the plurality of gear block assemblies comprises four or more even-number gear block assemblies 60, the gear block assemblies 60 configured on opposing sides of the cam assembly 30 engage and disengage in unison from the secondary or output gear element 50. For example as shown in FIG. 3, an embodiment of the gearbox mechanism 20 featuring four gear block assemblies 60 is depicted. Similarly, FIG. 7C depicts an embodiment of the gearbox mechanism 100C featuring six gear block assemblies 60. This is accomplished by ensuring that the individual pathways or grooves formed in the circumferential surface of the cam assembly are in phase with one another on opposing sides of the cam assembly circumference.

Figure 8A:
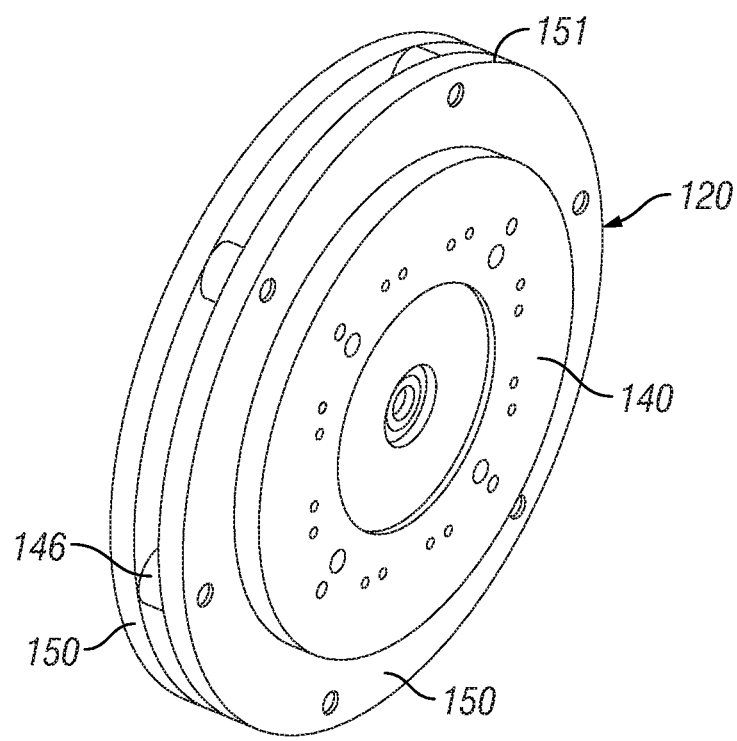
FIG. 8A is a perspective view of an embodiment of the motorized gearbox mechanism of the present invention.
Figure 8B:
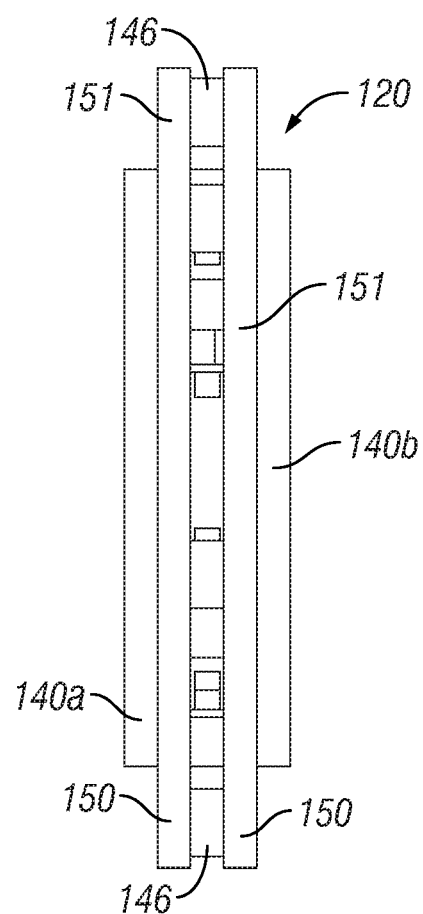
FIG. 8B is a side elevation view thereof.
Figure 9:
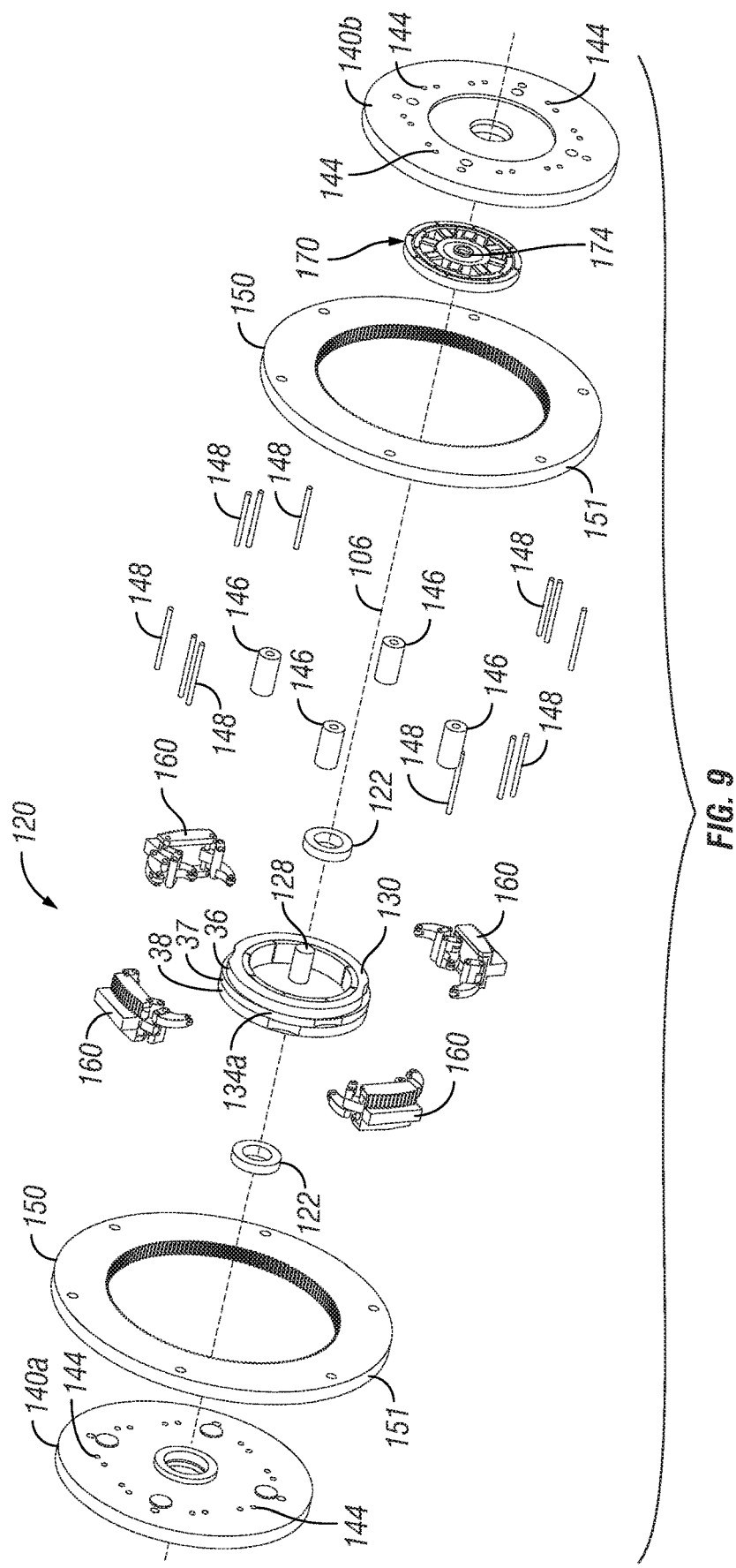
FIG. 9 is an exploded perspective view thereof.

With reference now to FIGS. 8A, 8B, and 9, a more advanced embodiment of the present invention is shown, wherein the power source is incorporated within the gearbox mechanism creating a self-contained, motorized gearbox mechanism 120. The motorized gearbox mechanism 120 includes a rotor element or assembly 133 configured in the cam assembly 130 of the gearbox that rotates about a stator element or assembly 170, which is nested in a cavity 126 formed in the cam assembly body 135 and attached to a stationary plate of the gearbox mechanism 120. When energized, the stator assembly 170 interacts with the rotor assembly 133 inducing the cam/rotor assembly 130 to rotate about its central axis 106, thereby driving the output gear element 150 via the plurality of cam-actuated gear block assemblies 160 in essentially the same manner as described earlier. The motorized gearbox mechanism 120 may be powered electrically, hydraulically, pneumatically or by steam, or any conventional power source that can be adapted to use an integral stator/rotor assembly configured in the cam assembly body 135 to generate rotative power in the cam/rotor assembly 130.

For example, as depicted in FIGS. 9 and 10A-C, an electrically powered variant of the motorized gearbox mechanism 120 includes two stationary plates 140a, 140b between which are configured an output or power gear 150, a cam/rotor assembly 130 and a plurality of cam-acutated gear block assemblies 160, which transfer power from the cam/rotor assembly 130 to the output or power gear element 150. In this case the depicted electrically powered variant comprises a conventional brushless DC motor. The cam/rotor assembly 130 comprises a generally circular body 135 having an annular cavity or hollow space 126 formed in one face defining an inner circumferential surface 134b. The annular cavity or hollow space 126 is dimensioned so as to receive the stator element 170 without constraining the rotational capability of the cam/rotor assembly 130.

The cam/rotor assembly 130 features a central shaft 128 aligned with the central axis 106 of the gearbox mechanism 120. The central shaft 128 can be employed as a stabilizing element to the rotational elements within the motorized gearbox mechanism 120 between the stationary plates (i.e., back plate 140a and stator plate 140b). It is understood that the central shaft 128 may be integral to, or separate but affixed to, the cam/rotor assembly 130 as depicted in the Figures; or alternatively, comprise a separate shaft that extends from the rear or back stationary plate 140a through a central aperture (not shown) in the cam/rotor assembly 130 through the stator core 172 to the front stationary or stator plate 140b.

One or more bearing assemblies 122 may be used to isolate the cam/rotor assembly 130 from the stationary plates 140a, 140b and stator assembly 170 so that the cam/rotor assembly 130 can rotate freely between the two stationary plates 140a, 140b. Likewise, spacer elements 146 configured between the two stationary plates 140a, 140b ensure that movement of the power gear element 150 is not impeded by the stationary plates 140a, 140b. The gear block assemblies 160 are evenly spaced about the circumference of the cam/rotor assembly 130.

The rotor elements 133 are attached to the inner circumferential surface 134b of the cam mechanism body 135. In the electrically-powered embodiment depicted in FIGS. 9 and 10A-C, the rotor elements 133 comprise permanent magnets or other suitable magnetic materials, which are attached to the inner circumferential surface 134b of the cam mechanism body 135.

In the embodiment depicted in FIGS. 9 and 10A-C, the electrically-powered variant of the motorized gearbox mechanism 120 includes a stator assembly 170, which, when energized, creates a magnetic field that interacts with the rotor elements 133 inducing the cam/rotor assembly 130 to rotate about its central axis 106. The stator assembly 170 includes a stator core 172 that is fixably attached to the front stationary or stator plate 140b. The stator assembly 170 is dimensioned so as to be inserted into the annular cavity or hollow space 126 without constraining the rotational capability of the cam/rotor assembly 130.

In the depicted embodiment, the stator core 172 includes a centralized annular hub 173 that includes an extension 174 that is fixably attached to the stator plate 140b. It is further understood that the stator core 172 and hub 173 may further include wiring and conduits (not shown) to supply power and control the stator/rotor assembly. The annular hub 173 includes a central aperture 175 for receiving the central shaft 128 of the cam/rotor assembly 130. The stator core 172 further includes a plurality of pole elements 176 extending outward from the annular hub 173. Each of the pole elements 176 may include an arcuate extension 177 at their distal ends. Preferably the outer circumference of the stator assembly 170 is dimensioned so that only a small air gap separates the arcuate extension 177 of each pole element 176 from the rotor elements 133 configured on the to the inner circumferential surface 134b of the cam mechanism body 135.

Each pole element further includes a field winding 178 of metal wire or similar material. To generate rotational movement of the cam/rotor assembly 130, electrical power is applied to the field windings 178 in the stator assembly 170 inducing a magnetic field that results in a reactionary rotational movement of the rotor elements 133 and the cam/rotor assembly 130

The power generated by the interaction between the rotor elements 133 and stator assembly 170 causes the cam/rotor assembly 130 to rotate about the central axis 106. The cam/rotor assembly 130 includes about its outer circumferential surface 134a a plurality of unique pathways or grooves which each interface with the cam follower element of a single linkage assembly of each gear block assembly 160 so that as the cam/rotor assembly 130 rotates, the movement of each gear block is controlled in two dimensions in accordance with certain design parameters. By varying the radius of the pathway or grooves on the cam assembly 130 the linkage assemblies of each gear block assembly 160 drive its respective gear block through a two-dimensional circuit in response to rotation of the cam/rotor assembly 130. Broadly speaking, the two-dimensional circuit includes urging the gear block to engage the output gear element 150 and move or rotate the output gear element 150 a specified quantum distance prior to disengaging from the output gear element 150, and returning back the specified quantum distance to again reengage the output gear element 150 once again and repeat the process. The travel path or circuit of each gear block is controlled by adjusting the length and configuration of the various linkage assemblies and altering the pathways or grooves formed in the cam/rotor assembly 130.

The gear block assemblies 160 of the motorized gearbox mechanism 120 are essentially identical in form and function to the gear block assemblies 60 disclosed in the previous embodiment shown in FIGS. 4A-4D. Thus, each gear block assembly 160 includes a gear block 62 and a plurality of linkage assemblies, which connect the respective gear block 62 to the outer circumferential surface 134a of the cam/rotor assembly 130. Each linkage assembly comprises a linkage mechanism, which at its proximal end is pivotally attached to its respective gear block 62 and at its distal end includes a cam follower element, which maintains contact with its respective pathway or groove formed in the outer circumferential surface 134a of the cam/rotor assembly 130. Each linkage assembly includes a fixed axis pivot point that is connected to the two stationary plates 140a, 140b. While each linkage assembly can pivot about its respective fixed axis pivot point 48 the alignment and configuration of the pivot point remains fixed in relation to the two stationary plates 140a, 140b.

Figure 10A:
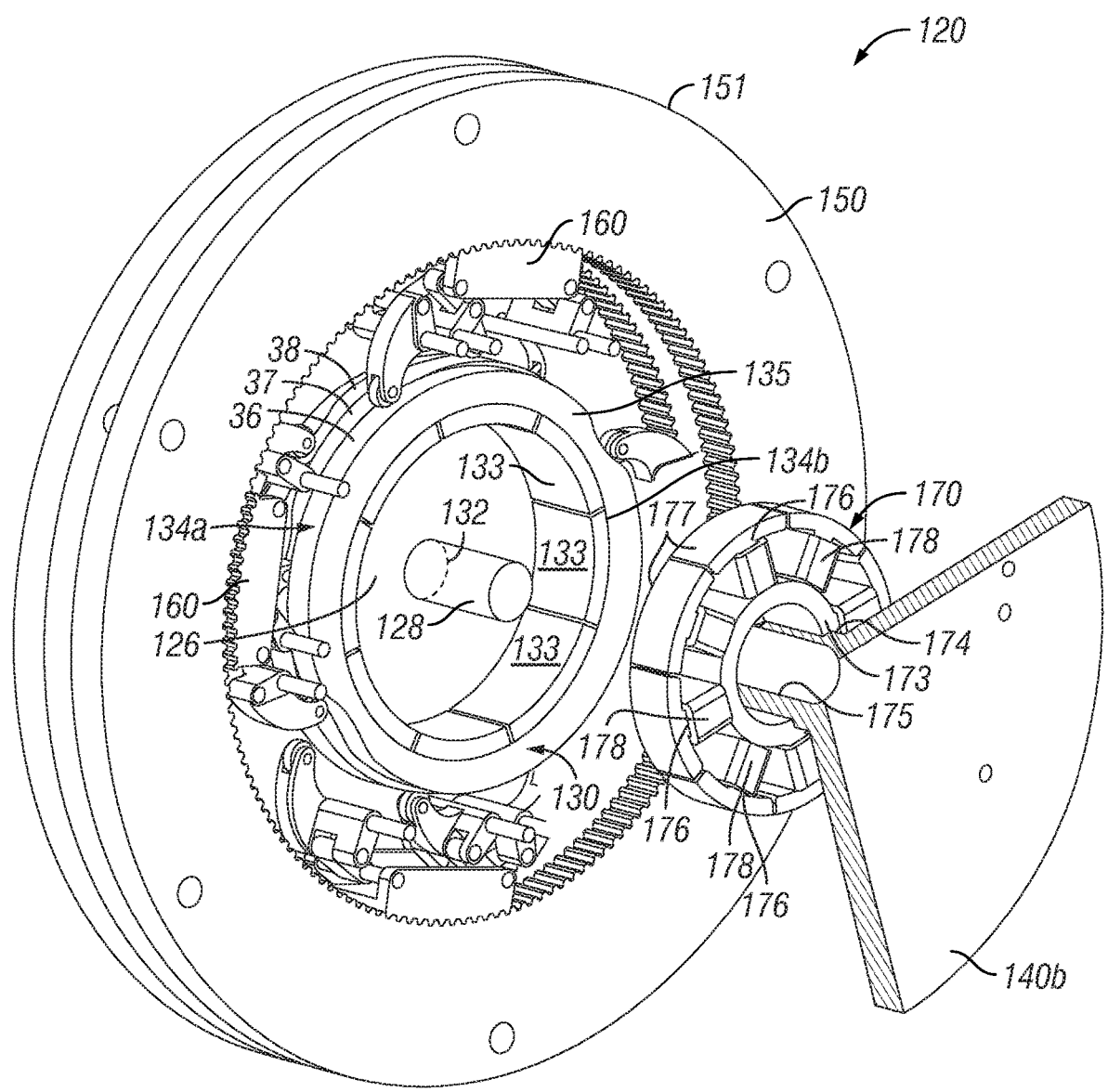
FIG. 10A is a partially-exploded perspective view of the embodiment of the motorized gearbox mechanism shown in FIG. 8A.
Figure 10B:
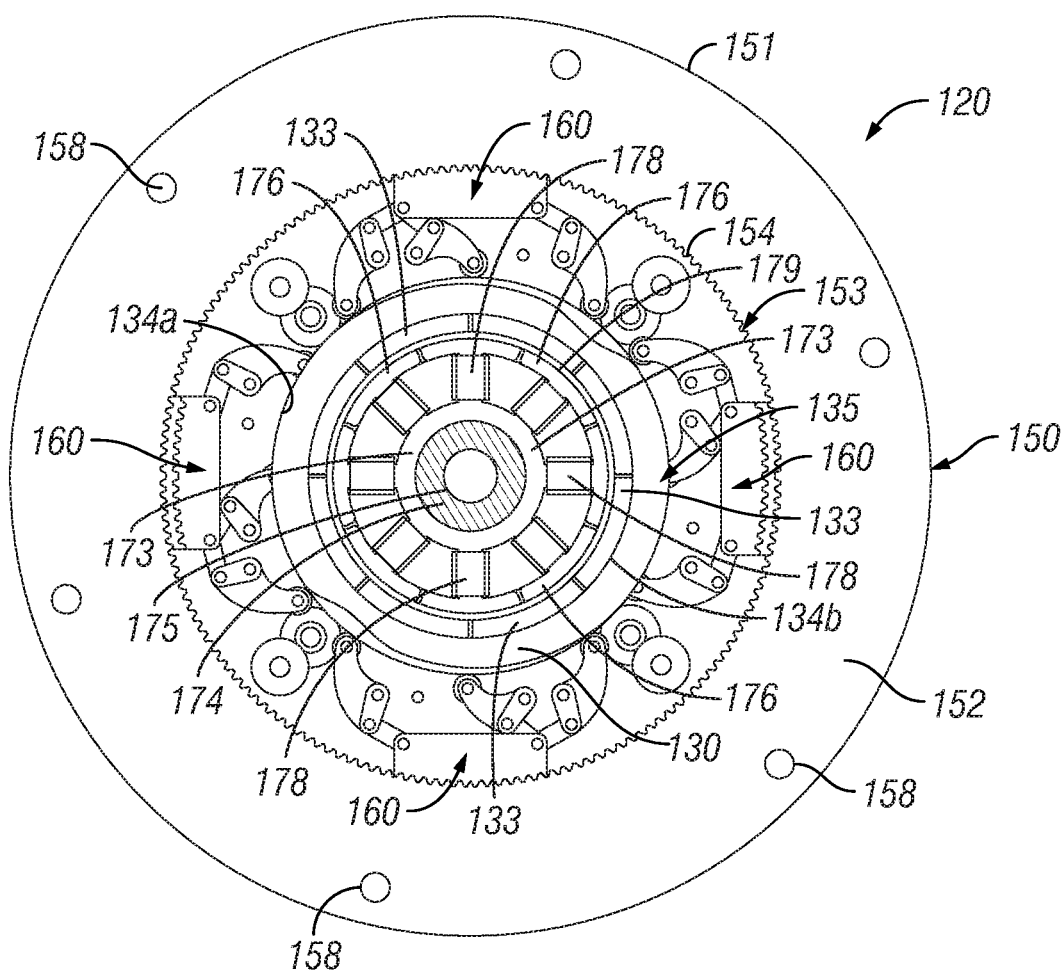
FIG. 10B is an end view thereof with the outer stationary or 2stator plate removed.

As shown in the embodiment depicted in FIGS. 8A, 8B and 9, the plurality of cam-actuated gear block assemblies 160 transfer power generated by the interaction between the rotor assembly 133 and stator assembly 170 to an annular secondary or output gear element 150. As shown in FIGS. 10A-B with further reference to FIGS. 4A-4D, in a preferred embodiment, each gear block assembly 160 includes a gear block 62 having an interface surface 63 (e.g., a plurality of projections or teeth 66) which correspond to a complementary interface surface 154 (e.g., projections or gear teeth) configured on an inner circumferential surface 153 of the annular secondary or output gear element 150. It is understood that the interface between the gear block 62 and the inner circumferential surface 153 of the output gear element 150 of the present invention comprises not only the preferred gear teeth as depicted, but also any complementary arrangement such as pins and holes or even friction fit surfaces.

While the annular output or power gear element 150 is depicted as two circular rings held apart by spacer elements 146, it is understood that the output or power gear element 150 may comprise a single circular ring. The output or power gear element 150 includes apertures or holes 158 for attaching to an output shaft or power takeoff (not shown). In addition, it is understood that the outer circumference 151 of the output or power gear element 150 may also comprise a surface to interface with some other gear train mechanism.

In addition, as depicted in FIG. 4, the gear block 62 may also include a divider/alignment block 68 dividing the interface surface 63 into two or more separate sections. The variant of a gear block 62 featuring the alignment block 68 is particularly suitable to embodiments which feature output or power gear elements 150 comprised of two circular rings.

As mentioned previously, the gear blocks 62 of the present invention are specifically designed to enable a greater surface area (e.g., greater number of gear teeth) to engage the output gear 150 at any given time, thereby spreading the stresses associated therein across a greater area. By dramatically increasing the contact area between the gear block 62 and the output gear 150 at any given time the mechanical stress level is significantly decreased.

In addition, the gear block assemblies 160 of the present invention reduce backlash to zero and even preloaded conditions to create a tight connection between the cam/rotor assembly 130 and the powered device. This is an extremely desirable feature especially for high vibration applications. Moreover, because the stresses associated with engagement of the gear block 62 against the output gear 150 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

As with the previous embodiment, in a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam/rotor assembly 130. The lower connector arm further includes a pivot point having a fixed axis of rotation relative to the central axis 106 of rotation of the cam/rotor assembly 130.

With continued reference to FIGS. 9 and 10A-B in view of FIGS. 4A-4D, a preferred embodiment of the gear block assembly 160 is shown. In the depicted preferred embodiment, each gear block assembly 160 includes three linkage assemblies 70, 80, 90, which are each pivotally coupled to the gear block 62 and include a cam follower element 74, 84, 94, respectively, which maintain constant contact with the outer circumferential surface 134a of the cam/rotor assembly 130. The gear block 62 includes pivot bars configured on opposing ends that serve to pivotally couple the linkage assemblies 70, 80, 90 to the gear block 62. For example, two linkage assemblies 70, 80 are pivotally coupled to a pivot bar 64a on one end while a single linkage assembly 90 is pivotally coupled to the pivot bar 64b on the opposing end. Each of the linkage assemblies 70, 80, 90 includes a pivot point 78, 88, 98, respectively, that is rotatively coupled to a fixed axis of rotation relative to the central axis 6 of rotation of the cam/rotor assembly 130. As depicted, each fixed axis of rotation comprises a pivot pin 148 that is secured in matching alignment holes 144 configured in the two stationary plates 140a, 140b. While each of the linkage assemblies 70, 80, 90 can pivot about its respective fixed axis pivot point 78, 88, 98, respectively, the alignment and configuration of the pivot points remains fixed in relation to the two stationary plates 140a, 140b. Each of the linkage assemblies 70, 80, 90 is biased so that its respective cam follower element 74, 84, 94, respectively, maintains contact with the surface of its respective pathway or groove formed in the cam/rotor assembly 130 throughout the rotation cycle of the cam/rotor assembly 130.

In the depicted preferred embodiment, each of the linkage assemblies may further comprise at least two connector arms. For example, the first linkage assembly 70 may include a lower connector arm 72 that is pivotally connected to an upper connector arm 74, which is also pivotally connected to the gear block 62. A pivot pin 71 serves to pivotally connect the lower connector arm 72 to the upper connector arm 74. The lower connector arm 72 includes a cam follower element 74 at its distal end. In a preferred embodiment the cam follower element 74 comprises a bearing wheel 75 rotatively coupled at the distal end of the lower connector arm by means of an axle 76. The lower connector arm 72 further includes a pivot point 78 that is rotatively coupled to a fixed axis of rotation relative to the central axis 106 of rotation of the cam/rotor assembly 130. For example, a pivot pin 48a secured in matching alignment holes 144 configured in the two stationary plates 140a, 140b serves as a fixed axis of rotation relative to the central axis 106 of rotation of the cam assembly 130. While the lower connector arm 72 may pivot about its fixed axis pivot point 78, the alignment and configuration of the pivot point 78 remains fixed in relation to the two stationary plates 140a, 140b. Each of the pivotal connections in the first linkage assembly 70 is biased so that the cam follower element 74 maintains contact with the surface of its respective pathway or groove 36 formed in the outer circumferential surface 134a of the cam/rotor assembly 130 throughout the rotation cycle of the cam/rotor assembly 130. For example, the pivotal connections may further include torsional spring elements (not shown) which bias the first linkage assembly 70 so that the cam follower element 74 maintains contact with the surface of its respective pathway or groove 36 formed in the cam/rotor assembly 130 of the cam/rotor assembly 130 throughout the rotation cycle of the cam/rotor assembly 130. Alternatively, the cam follower element of each linkage assembly may include conjugate cams to bias the pivotal connections in the linkage assembly. Alternatively or in addition, a ring spring connecting all of the gear blocks 62 in a gear train may be used as a biasing mechanism in accordance with the present invention.

Similarly, the second linkage assembly 80 may include a lower connector arm 82 that is pivotally connected to an upper connector arm 84, which is also pivotally connected to the gear block 62. The upper connector arm 84 is pivotally connected to the gear block 62 by means of the same pivot bar 64a used to pivotally connect the upper connector arm 74 of the first linkage assembly 70. A pivot pin 81 serves to pivotally connect the lower connector arm 82 to the upper connector arm 84. The lower connector arm 82 includes a cam follower element 84 at its distal end. In a preferred embodiment the cam follower element 84 comprises a bearing wheel 85 rotatively coupled at the distal end of the lower connector arm by means of an axle 86. The lower connector arm 82 further includes a pivot point 88 that is rotatively coupled to a fixed axis of rotation relative to the central axis 106 of rotation of the cam/rotor assembly 130. For example, a pivot pin 48b secured in matching alignment holes 144 configured in the two stationary plates 140a, 140b serves as a fixed axis of rotation relative to the central axis 106 of rotation of the cam/rotor assembly 130. While the lower connector arm 82 may pivot about its fixed axis pivot point 88, the alignment and configuration of the pivot point 88 remains fixed in relation to the two stationary plates 140a, 140b. Each of the pivotal connections in the second linkage assembly 80 is biased so that the cam follower element 84 maintains contact with the surface of its respective pathway or groove 37 formed in the outer circumferential surface 134a of the cam/rotor assembly 130 throughout the rotation cycle of the cam/rotor assembly 130. For example, the pivotal connections may further include torsional spring elements (not shown) which bias the second linkage assembly 80 so that the cam follower element 84 maintains contact with the surface of its respective pathway or groove 37 formed in the outer circumferential surface 134a of the cam/rotor assembly 130 throughout the rotation cycle of the cam/rotor assembly 130. Alternatively or in addition, a ring spring connecting all of the gear blocks 62 in a gear train may be used as a biasing mechanism in accordance with the present invention.

Likewise, the third linkage assembly 90 may include a lower connector arm 92 that is pivotally connected to an upper connector arm 94, which is also pivotally connected to the gear block 62. The upper connector arm 94 of the third linkage assembly 90 is pivotally coupled to a pivot bar 64b configured on the opposing end of the gear block 62 as the pivot bar 64a to which the upper connector arms 74, 84 of the first and second linkage assemblies 70, 80 are rotatively coupled. A pivot pin 91 serves to pivotally connect the lower connector arm 92 to the upper connector arm 94. The lower connector arm 92 includes a cam follower element 94 at its distal end. In a preferred embodiment the cam follower element 94 comprises a bearing wheel 95 rotatively coupled at the distal end of the lower connector arm by means of an axle 96. The lower connector arm 92 further includes a pivot point 98 that is rotatively coupled to a fixed axis of rotation relative to the central axis 106 of rotation of the cam/rotor assembly 130. For example, a pivot pin 48c secured in matching alignment holes 144 configured in the two stationary plates 140a, 140b serves as a fixed axis of rotation relative to the central axis 106 of rotation of the cam/rotor assembly 130. While the lower connector arm 92 may pivot about its fixed axis pivot point 98, the alignment and configuration of the pivot point 98 remains fixed in relation to the two stationary plates 140a, 140b. Each of the pivotal connections in the second linkage assembly 90 is biased so that the cam follower element 94 maintains contact with the surface of its respective pathway or groove 38 formed in the outer circumferential surface 134a of the cam/rotor assembly 130 throughout the rotation cycle of the cam/rotor assembly 130. For example, the pivotal connections may further include torsional spring elements (not shown) which bias the second linkage assembly 90 so that the cam follower element 94 maintains contact with the surface of its respective pathway or groove 38 formed in the outer circumferential surface 134a of the cam/rotor assembly 130 throughout the rotation cycle of the cam/rotor assembly 130. Alternatively or in addition, a ring spring connecting all of the gear blocks 62 in a gear train may be used as a biasing mechanism in accordance with the present invention.

Each of the linkage assemblies 70, 80, 90 is biased so that its respective cam follower element 74, 84, 94 maintains contact with the surface of its respective pathway or groove formed in the outer circumferential surface 134a of the cam/rotor assembly 130 throughout the rotation cycle of the cam/rotor assembly 130. For example, cam follower element 74 maintains contact with the surface of a first pathway 36, cam follower element 84 maintains contact with the surface of a second pathway 37, and cam follower element 94 maintains contact with the surface of a third pathway 38. Each pathway has a unique circumference, the radius of which varies over the course of the pathway. Thus, for example as shown earlier in FIGS. 5 and 6, the first pathway 36 has a first radius $r_1$ at one part of its circumference that is greater than a second radius $r_2$ at another part of its circumference. This creates a unique, undulating path for each pathway as the cam/rotor assembly 130 rotates. While the cam/rotor assembly 130 depicted in FIGS. 9-10C, appears to be a single unit having a plurality of pathways or grooves formed in the outer circumferential surface 134a of the cam/rotor assembly 130, it is understood that the cam/rotor assembly 130 may also comprise a plurality of separate component discs and annular rings, each having a unique pathway formed in its outer circumferential surface, which are mechanically coupled to one another to assemble the cam/rotor assembly 130.

As the cam/rotor assembly 130 rotates, the cam follower element follows its respective pathway maintaining contact with the circumferential surface of the respective pathway. As the radius of the pathway changes, the respective linkage assembly pivots about its fixed axis pivot point to compensate. This pivoting of the linkage assembly about its fixed axis pivot point induces similar movement in the pivotal connection with the gear block 62, which results in movement of the gear block 62. Thus, as the cam/rotor assembly 130 rotates, the movement of the gear block 62 is controlled by the induced pivoting of the plurality linkage assemblies. For example, by varying the radius of the first pathway or groove 36 on the cam/rotor assembly 130, the first linkage assembly 70 pivots about its fixed axis pivot point 78 to compensate and maintain contact between the first cam follower 74 and the surface of the first pathway or groove 36. This pivoting of the first linkage assembly 70 about its fixed axis pivot point 78 induces movement in the pivotal connection with the gear block 62. Each linkage assembly acts independently of the other linkage assemblies due to the cam follower element of each linkage assembly following a distinct pathway formed in the circumferential surface of the cam assembly.

By varying the radius of each pathways or grooves 36, 37, 38 on the cam/rotor assembly 130, linkage assemblies 70, 80, 90 drive their respective gear block 62 through a two-dimensional circuit in response to rotation of the cam/rotor assembly 130. As shown in FIG. 4A, in general, the two-dimensional circuit 65 includes urging the gear block to engage the output gear element 50 or 150 and move or rotate the output gear element 50 or 150 a specified distance prior to disengaging from the output gear element 50 or 150, and returning back the specified quantum distance to again reengage the output gear element 50 or 150 once again and repeat the process. It is understood that the two-dimensional circuit 65 depicted in the drawings is not to scale and is somewhat exaggerated to illustrate the general principal of the invention. For example, the distance A-B would typically be much smaller than depicted. The travel path or circuit 65 of each gear block 62 is controlled by adjusting the length and configuration of the various linkage assemblies and altering the pathways or grooves formed in the cam/rotor assembly 130.

Figure 10C:
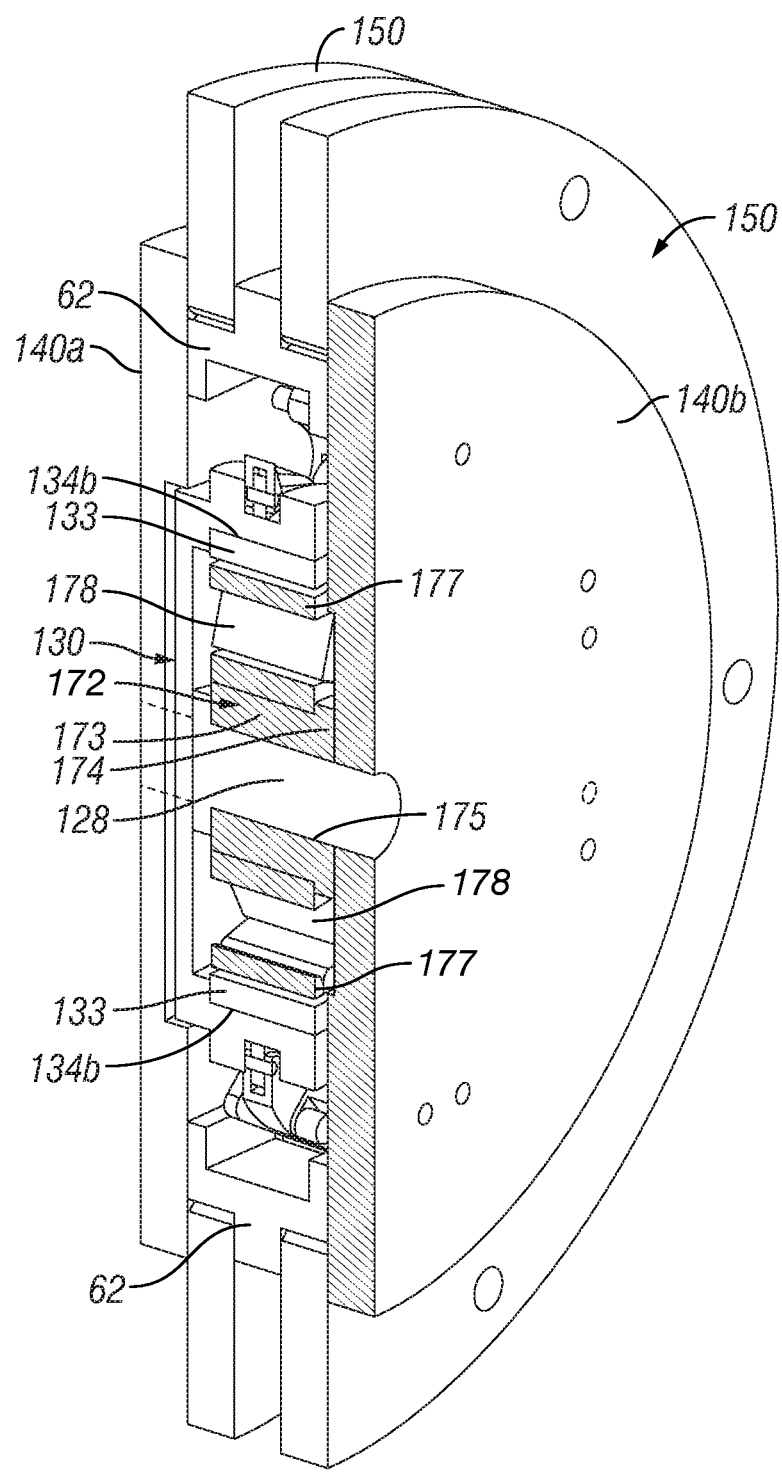
FIG. 10C is a close-up cross-sectional view of the motorized gearbox mechanism shown in FIG. 8A.

Thus, as shown in FIGS. 10A-C, in view of FIGS. 4A-D, when adapted to a motorized gearbox mechanism 120, a plurality of gear block assemblies 160 are configured about the central axis of the cam/rotor assembly 130. As the cam/rotor assembly 130 rotates, the cam follower elements (e.g., 74, 84, 94) of the respective linkage assemblies (e.g., 70, 80, 90) of each gear block assembly 160 maintain contact with a particular pathway or groove (e.g., 36, 37, 38) formed in the outer circumferential surface 134a of the cam/rotor assembly 130. The variance of distance from the center of rotation of the different pathways or grooves (e.g., 36, 37, 38) of the cam/rotor assembly 130 causes the linkage assemblies pivotally attached to its respective gear block 60 to work in concert to move their respective gear block through a predetermined circuit of movement 65. This predetermined circuit of movement 65 of the gear block 60 can be precisely calibrated to meet specific engineering requirements. For example, the torque ratio and speed reduction may be regulated and controlled by adjusting the circuit of movement 65 of each gear block assembly 160.

It will now be evident to those skilled in the art that there has been described herein an improved gearbox mechanism. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A motorized gearbox mechanism comprising in combination:
    a cam assembly that is rotatable about a central axis and has a plurality of pathways formed in an outer circumferential surface;
    a stator/rotor assembly contained within said cam assembly that induces said cam assembly to rotate about said central axis when energized;
    an annular output gear element coaxially configured about said cam assembly, said output gear element having a first interface surface on an inner circumferential surface; and
    a plurality of cam-actuated gear block assemblies spaced about the circumference of said cam assembly, wherein each gear block assembly includes
        a gear block connected to said plurality of pathways and having a second interface surface;
        wherein each gear block is driven through a two-dimensional circuit of movement in response to rotation of said cam assembly about said central axis, said circuit of movement comprising causing said second interface surface of said gear block to engage said first interface surface of said output gear element causing said gear block to move said output gear element a distance prior to disengaging.

2. The motorized gearbox mechanism of claim 1, wherein each of said gear blocks is connected to said plurality of pathways by a plurality of linkage assemblies, said plurality of linkage assemblies comprising three linkage assemblies in which a first and second linkage assemblies are pivotally attached to one end of said gear block and a third linkage assembly is pivotally attached to an opposing end of said gear block.

3. The motorized gearbox mechanism of claim 1, wherein said plurality of cam-actuated gear block assemblies comprises at least two gear block assemblies in which at least one gear block assembly is engaged with the output gear element at any particular instance in time.

4. The motorized gearbox mechanism of claim 3, wherein only one gear block assembly is disengaged with said output gear element at said any particular instance in time.

5. The motorized gearbox mechanism of claim 1, wherein said plurality of cam-actuated gear block assemblies comprises four or more even-numbered gear block assemblies in which the gear block assemblies configured on opposing sides of said cam/rotor assembly engage and disengage in unison said output gear element.

6. The motorized gearbox mechanism of claim 2, wherein each of said plurality of linkage assemblies further comprises two pivotally connected linkage arms.

7. The motorized gearbox mechanism of claim 6, wherein said pivotally connected linkage arms comprise an upper connector arm pivotally coupled to said gear block at a first end and pivotally coupled at a second end to a lower connector arm, said lower connector arm having a fixed axis pivot point formed therein and said cam follower element configured at its distal end.

8. The motorized gearbox mechanism of claim 7, wherein said fixed axis pivot point in each of said plurality of linkage assemblies comprises a pivot pin secured between two stationary plates.

9. The motorized gearbox mechanism of claim 1, wherein each of the plurality of pathways formed in the circumferential surface of the cam assembly has a unique circumference, the radius of which varies over the course of said pathway.

10. The motorized gearbox mechanism of claim 1, wherein said annular output gear element comprises two matching annular gear elements set apart by a plurality of spacer elements.

11. The motorized gearbox mechanism of claim 10, wherein each said gear block further includes a divider block extending from the second interface surface which aligns said gear block between said two matching annular gear elements.

12. The motorized gearbox mechanism of claim 1, wherein each said gear block engages and disengages from said output gear element with zero backlash.

13. The motorized gearbox mechanism of claim 1, wherein said stator/rotor assembly is electrically powered.

14. The motorized gearbox mechanism of claim 1, wherein said stator/rotor assembly is hydraulically powered.

15. The motorized gearbox mechanism of claim 1, wherein said stator/rotor assembly is pneumatically powered.

16. The motorized gearbox mechanism of claim 1, wherein said stator/rotor assembly is steam powered.

17. The motorized gearbox mechanism of claim 1, wherein said stator/rotor assembly comprises a rotor element attached to said cam assembly and a stator assembly that is fixably attached to a stationary plate.

18. The motorized gearbox mechanism of claim 17, wherein said cam assembly includes a cavity formed in one face of said cam assembly that is dimensioned to receive said stator/rotor assembly without constraining the rotational capability of said cam assembly.

19. The motorized gearbox mechanism of claim 18, wherein said rotor element comprises a plurality of permanent magnets attached to an inner circumferential surface of said cavity formed in said cam assembly.

20. The motorized gearbox mechanism of claim 19, wherein said stator assembly includes a stator core fixably attached to said stationary plate, said stator core comprising an annular hub having a plurality of pole elements extending therefrom and having a central aperture for receiving a central shaft from said cam assembly.

* * * * *